(12) United States Patent
Jang

(10) Patent No.: US 12,368,981 B2
(45) Date of Patent: Jul. 22, 2025

(54) IMAGE SENSOR

(71) Applicant: SAMSUNG ELECTRONICS CO., LTD., Suwon-si (KR)

(72) Inventor: Chan Young Jang, Pohang-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 195 days.

(21) Appl. No.: 18/096,235

(22) Filed: Jan. 12, 2023

(65) Prior Publication Data

US 2023/0232136 A1    Jul. 20, 2023

(30) Foreign Application Priority Data

Jan. 14, 2022   (KR) .................. 10-2022-0005874

(51) Int. Cl.
*H04N 25/78* (2023.01)
*H04N 25/11* (2023.01)

(52) U.S. Cl.
CPC ............ *H04N 25/78* (2023.01); *H04N 25/11* (2023.01)

(58) Field of Classification Search
CPC ...... H04N 25/78; H04N 25/11; H04N 25/134; H04N 25/704; H01L 27/14603; H01L 27/14627; H01L 27/14636; H01L 27/14645
See application file for complete search history.

(56) References Cited

U.S. PATENT DOCUMENTS

| | | | |
|---|---|---|---|
| 8,446,498 B2 | 5/2013 | Ishiwata et al. | |
| 9,571,760 B2 | 2/2017 | Kang et al. | |
| 9,661,306 B2 | 5/2017 | Hirota | |
| 10,484,627 B2 | 11/2019 | Zhou | |
| 10,924,667 B2 | 2/2021 | Kang et al. | |
| 10,999,544 B2 | 5/2021 | Wang et al. | |
| 11,075,236 B2 | 7/2021 | Shiraishi et al. | |
| 11,363,222 B2* | 6/2022 | Lee | H04N 25/78 |
| 2017/0347042 A1* | 11/2017 | Borthakur | H04N 23/672 |
| 2018/0026065 A1 | 1/2018 | Hsieh et al. | |
| 2019/0199950 A1* | 6/2019 | Yokogawa | H01L 27/14621 |
| 2020/0161352 A1 | 5/2020 | Takahashi et al. | |
| 2020/0186723 A1* | 6/2020 | Kang | H04N 23/67 |
| 2020/0322559 A1 | 10/2020 | Shim et al. | |
| 2020/0396388 A1 | 12/2020 | Kim et al. | |

FOREIGN PATENT DOCUMENTS

JP         2020-092335 A      6/2020

* cited by examiner

*Primary Examiner* — Albert H Cutler
(74) *Attorney, Agent, or Firm* — Sughrue Mion, PLLC

(57) ABSTRACT

An image sensor is provided. The image sensor includes: a pixel array including a plurality of pixel groups arranged in a Bayer pattern; a row driver connected to a row of the pixel array; and a readout circuit configured to sample a pixel signal from the pixel array, to compare the sampled pixel signal with a ramp signal, and to generate a digital image signal based on a comparison of the pixel signal and the ramp signal. A pixel group of the plurality of pixel groups includes sixteen sub-pixels arranged in a 4×4 array, the 4×4 array includes a plurality of readout areas, and the plurality of readout areas are activated alternately with each other. In each of the plurality of readout areas in the pixel group, micro lenses are arranged asymmetrically with each other.

16 Claims, 22 Drawing Sheets

IMAGE SENSOR

CROSS-REFERENCE TO RELATED APPLICATION

This application claims priority from Korean Patent Application No. 10-2022-0005874, filed on Jan. 14, 2022 in the Korean Intellectual Property Office, the disclosure of which is incorporated by reference herein in its entirety.

BACKGROUND

1. Field

The present disclosure relates to an image sensor.

2. Description of Related Art

An image sensing device may be a semiconductor device which converts optical information into an electrical signal. The image sensing device may include a charge-coupled device (CCD) based image sensing device and a complementary metal-oxide semiconductor (CMOS) based image sensing device.

A CMOS image sensor may include a plurality of pixels as two-dimensionally arranged. Each of the pixels may include, for example, a photodiode (PD). The photodiode may serve to convert incident light thereto into an electrical signal.

Recently, with development of computer industry and communication industry, demand for the image sensor with improved performance is increasing in various fields such as digital cameras, camcorders, smartphones, game devices, security cameras, medical micro cameras, and robots.

SUMMARY

One or more example embodiments provide an image sensor that implements low-power and high-performance Phase Detection Auto Focus (PDAF), and improves image quality.

Example embodiments are not limited to the above-mentioned purpose. Other purposes and advantages that are not mentioned may be understood based on following descriptions, and may be more clearly understood based on example embodiments.

According to an aspect of an example embodiment, an image sensor includes: a pixel array including a plurality of pixel groups arranged in a Bayer pattern, wherein a pixel group of the plurality of pixel groups, includes sixteen sub-pixels arranged in a 4×4 array, wherein the 4×4 array includes a plurality of readout areas, and wherein the plurality of readout areas are activated alternately with each other; a row driver connected to a row of the pixel array; and a readout circuit configured to sample a pixel signal from the pixel array, to compare the sampled pixel signal with a ramp signal, and to generate a digital image signal based on a comparison of the pixel signal and the ramp signal. In each of the plurality of readout areas in the pixel group, micro lenses are arranged asymmetrically with each other.

According to an aspect of an example embodiment, an image sensor includes: a pixel array including a plurality of pixel groups arranged in a Bayer pattern, wherein a pixel group of the plurality of pixel groups includes sixteen sub-pixels; a row driver connected to a row of the pixel array; and a readout circuit configured to sample a pixel signal from the pixel array, to compare the sampled pixel signal with a ramp signal, and to generate a digital image signal based on a comparison of the pixel signal and the ramp signal. An outer area of the pixel group surrounds an inner area of the pixel group, at least one shared micro lens is disposed in the inner area, a single micro lens is disposed on each of sub-pixel in the outer area, the pixel group includes a plurality of readout areas, the readout circuit is configured to read out pixel values of sub-pixels in at least two readout areas and to detect a phase value based on the pixel values, and micro lenses are asymmetrically arranged in each of the at least two readout areas.

According to an aspect of an example embodiment, an image sensor includes: a pixel array including a plurality of pixel groups arranged in a Bayer pattern, wherein a pixel group of the plurality of pixel groups includes sixteen sub-pixels; a row driver connected to a row of the pixel array; and a readout circuit configured to sample a pixel signal from the pixel array, to compare the sampled pixel signal with a ramp signal, and to generate a digital image signal based on a comparison of the pixel signal and the ramp signal. A quarter micro lens is disposed on each of first sub-pixels respectively disposed at four corners of the pixel group, and a single micro lens is disposed on each of second sub-pixels, other than the four first sub-pixels, in the pixel group.

BRIEF DESCRIPTION OF DRAWINGS

The above and other aspects will become more apparent from the following description of example embodiments, taken in conjunction with the attached drawings, in which.

DETAILED DESCRIPTIONS

Hereinafter, example embodiments will be described in detail with reference to the accompanying drawings. Each example embodiment is not excluded from being associated with one or more features of another example or another example embodiment also provided herein or not provided herein but consistent with the present disclosure.

It will be understood that, although the terms "first", "second", "third", and so on may be used herein for illustrating various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Figure 1:
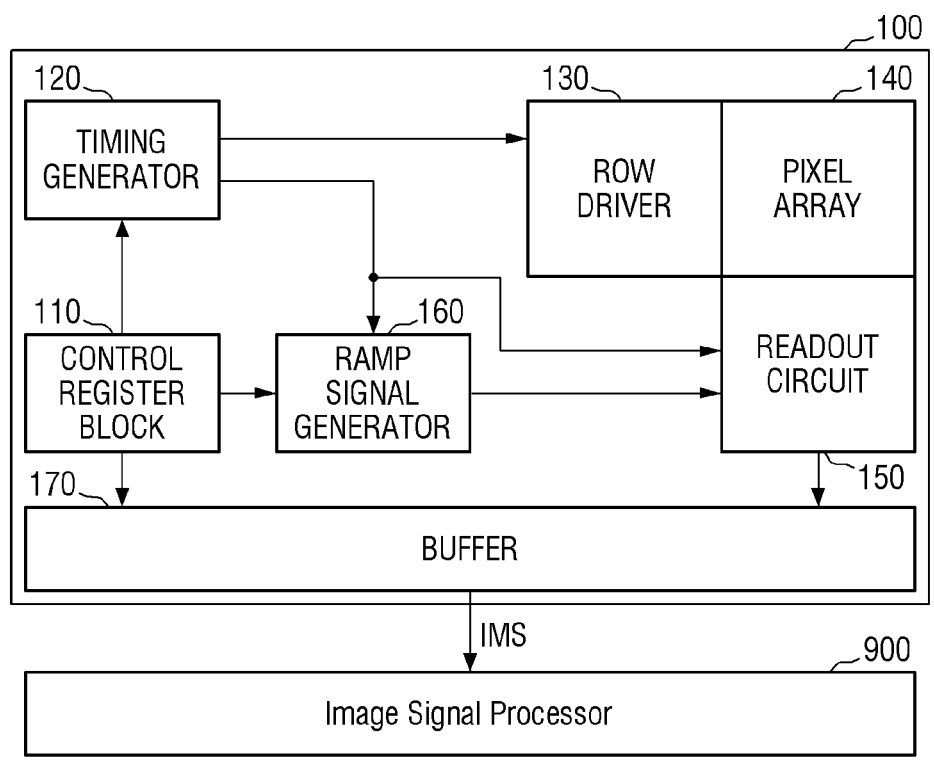
FIG. 1 is a block diagram of an image sensing device according to some example embodiments.

FIG. 1 is a block diagram of an image sensing device according to some example embodiments.

Referring to FIG. 1, an image sensing device 1 may include an image sensor 100 and an image signal processor 900.

The image sensor 100 may sense an image of a sensing target using light, and may generate an image signal IMS based on the sensed image. In some example embodiments, the generated image signal IMS may be, for example, a digital signal. However, example embodiments are not limited thereto.

The image signal IMS may be provided to the image signal processor 900 for processing thereof. The image signal processor 900 may receive the image signal IMS output from a buffer 170 of the image sensor 100 and process the received image signal IMS for displaying thereof.

In some example embodiments, the image signal processor 900 may perform digital binning on the image signal IMS output from the image sensor 100. The image signal IMS output from the image sensor 100 may be a raw image signal from a pixel array 140 that has not been subjected to analog binning or may be the image signal IMS that has been subjected to analog binning.

In some example embodiments, the image sensor 100 and the image signal processor 900 may be disposed separately from each other as shown. For example, the image sensor 100 may be mounted on a first chip, and the image signal processor 900 may be mounted on a second chip. In this case, the image sensor 100 and the image signal processor 900 may communicate with each other via a predefined interface. However, example embodiments are not limited thereto. The image sensor 100 and the image signal processor 900 may be implemented into one package, for example, an MCP (multi-chip package).

The image sensor 100 may include a control register block 110, a timing generator 120, a row driver 130, the pixel array 140, a readout circuit 150, a ramp signal generator 160, and the buffer 170.

The control register block 110 may control overall operations of the image sensor 100. In particular, the control register block 110 may transmit an operation signal directly to the timing generator 120, the ramp signal generator 160 and the buffer 170.

The timing generator 120 may generate a signal as a reference for an operation timing of various components of the image sensor 100. The operation timing reference signal generated by the timing generator 120 may be transmitted to the row driver 130, the readout circuit 150, the ramp signal generator 160, and the like.

The ramp signal generator 160 may generate and transmit a ramp signal used in the readout circuit 150. For example, the readout circuit 150 may include a correlated double sampler (CDS), a comparator, etc. The ramp signal generator 160 may generate and transmit a ramp signal used in the CDS, the comparator, and the like.

The buffer 170 may include, for example, a latch circuit. The buffer 170 may temporarily store therein the image signal IMS to be provided to an external component, and may transmit the image signal IMS to an external memory or an external device.

The pixel array 140 may sense an external image. The pixel array 140 may include a plurality of sub-pixels which form a plurality of pixels (or unit pixels). The row driver 130 may selectively activate a row of the pixel array 140.

The readout circuit 150 may sample a pixel signal provided from the pixel array 140, compare the sampled signal with the ramp signal, and convert an analog image signal (data) into a digital image signal (data), based on the comparison result.

Figure 2:
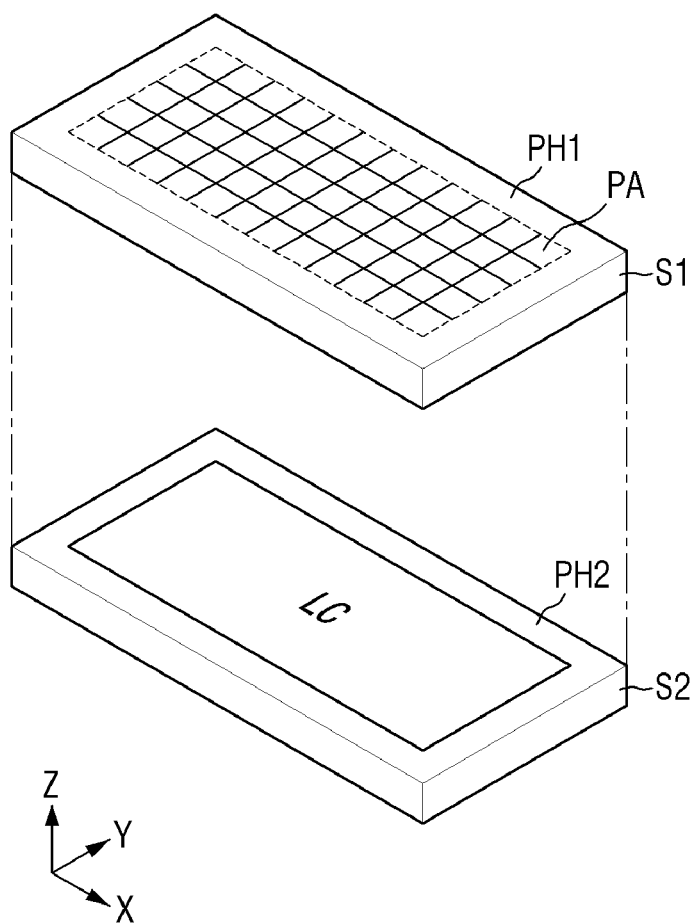
FIG. 2 is a diagram showing a conceptual layout of an image sensor according to some example embodiments.

FIG. 2 is a diagram showing a conceptual layout of an image sensor according to example embodiments.

Referring to FIG. 2, an image sensor 100 may include first and second areas S1 and S2 stacked in a third direction Z. Each of the first and second areas S1 and S2 may extend in a first direction X and a second direction Y as shown. The blocks shown in FIG. 1 may be disposed in the first and second areas S1 and S2.

Additionally, a third area in which a memory is disposed may be disposed under the second area S2. In this regard, the memory disposed in the third area may receive image data transfer from the first and second areas S1 and S2, store or process the same, and re-transmit the image data to the first and second area S1 and S2. In this regard, the memory may include a memory element such as a dynamic random access memory (DRAM) element, a static random access memory (SRAM) element, a spin transfer torque magnetic random access memory (STT-MRAM) element, and a flash memory element. When the memory includes, for example, the DRAM element, the memory may receive and process the image data at relatively high speed. Further, in some example embodiments, the memory may be disposed in the second area S2.

The first area S1 may include a pixel array area PA and a first peripheral area PH1. The second area S2 may include a logic circuit area LC and a second peripheral area PH2. The first and second areas S1 and S2 may be sequentially stacked along the third direction Z.

In the first area S1, the pixel array area PA may be an area in which the pixel array (140 in FIG. 1) as described with reference to FIG. 1 is disposed. The pixel array area PA may include a plurality of sub-pixels arranged in a matrix form. As described below in more detail, each sub-pixel may include a photodiode and transistors.

The first peripheral area PH1 may include a plurality of pads, and may be disposed around the pixel array area PA.

The plurality of pads may transmit and receive an electrical signal to and from an external device.

In the second area S2, the logic circuit area LC may include electronic elements (i.e., circuitry) including a plurality of transistors. The electronic elements included in the logic circuit area LC may be electrically connected to the pixel array area PA and may provide a certain signal to sub-pixels of each pixel of the pixel array area PA or control an output signal.

In the logic circuit area LC, for example, the control register block 110, the timing generator 120, the row driver 130, the readout circuit 150, the ramp signal generator 160, the buffer 170, etc., as described with reference to FIG. 1, may be disposed. In the logic circuit area LC, for example, the blocks other than the pixel array 140 among the blocks of FIG. 1 may be disposed.

The second peripheral area PH2 may also be disposed in the second area S2 and in an area corresponding to the first peripheral area PH1 of the first area S1. However, example embodiments are not limited thereto.

Figure 3:
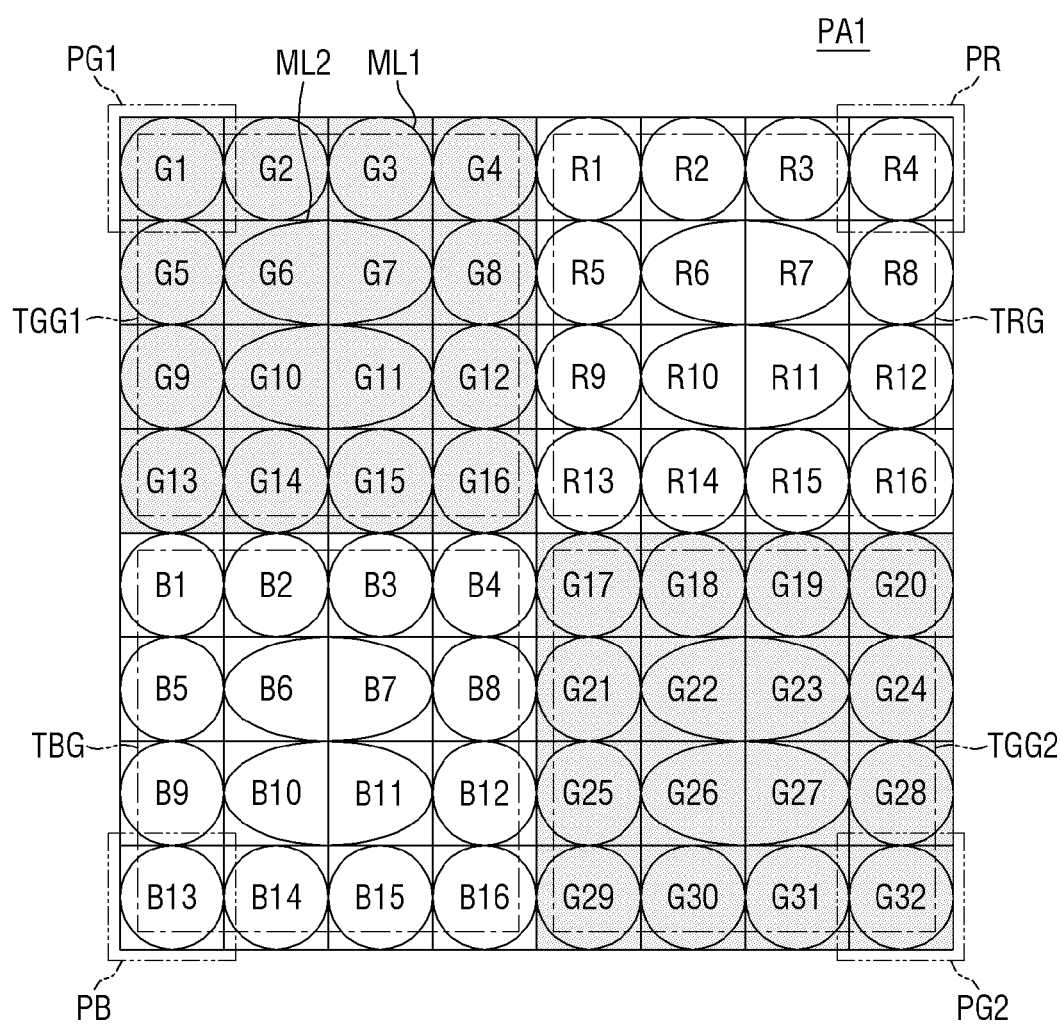
FIG. 3 is a diagram for illustrating a pixel array area according to some example embodiments.
Figure 4:
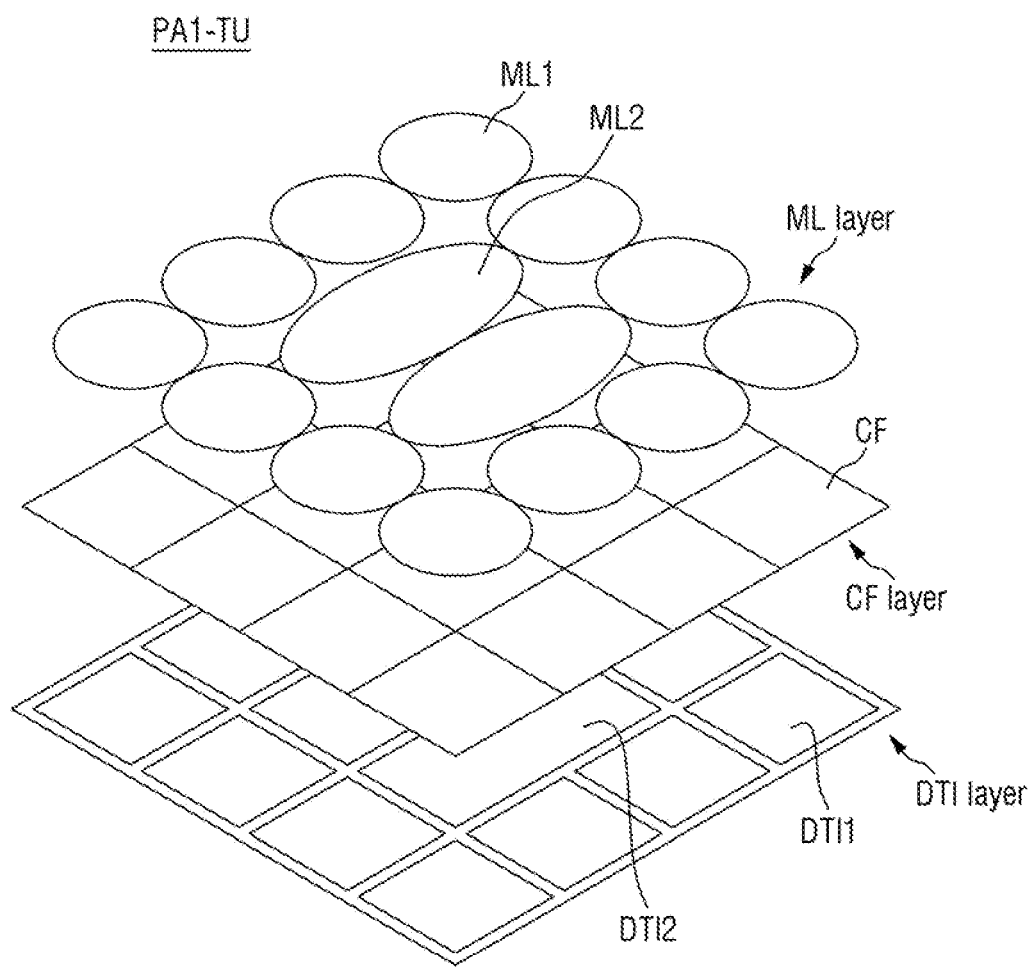
FIG. 4 is a diagram to conceptually illustrate a configuration of a pixel array area according to some example embodiments.
Figure 5:
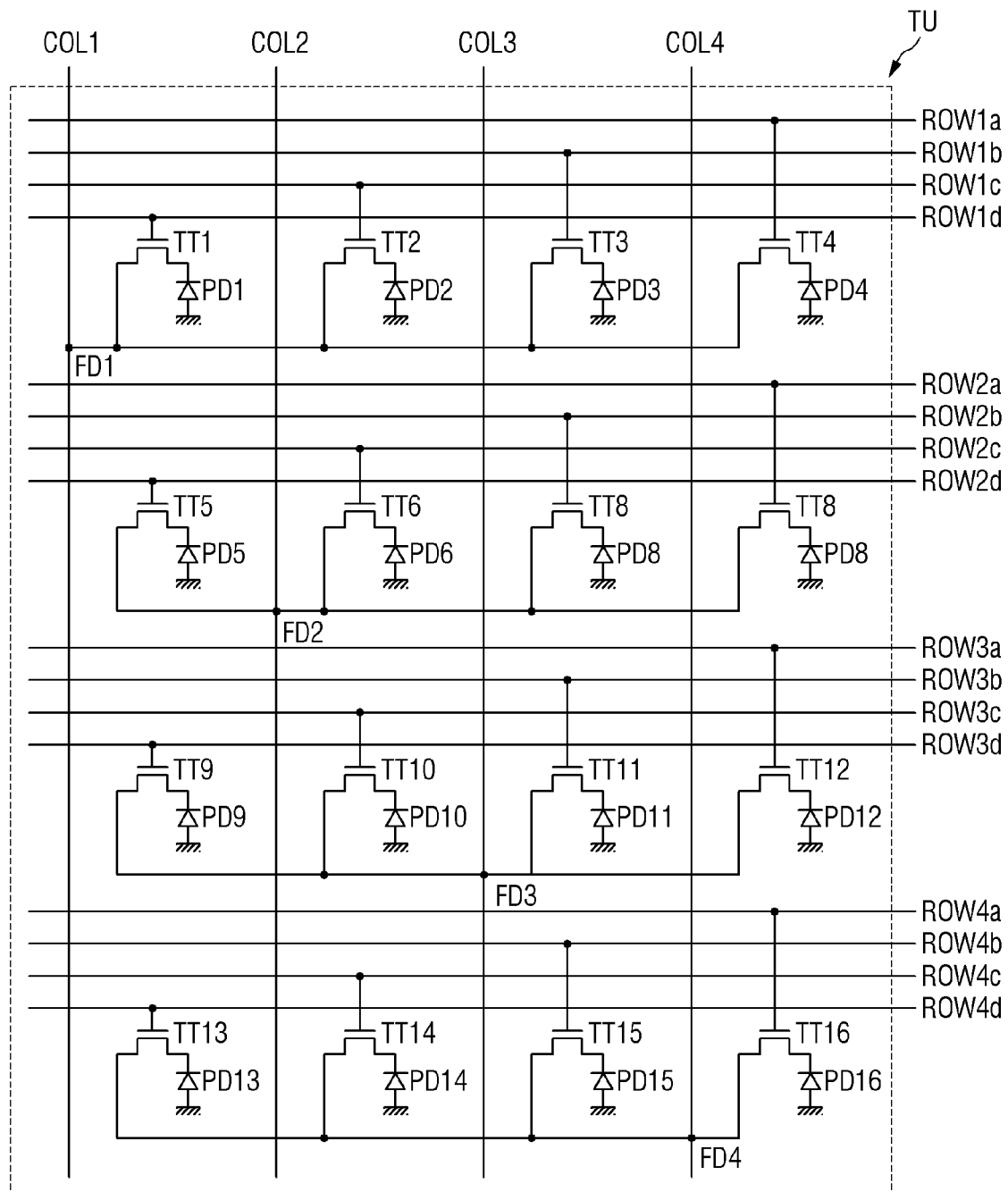
FIG. 5 is a circuit diagram of a pixel array according to some example embodiments.

FIG. 3 is a diagram for illustrating a pixel array area according to some example embodiments, FIG. 4 is a diagram to conceptually illustrate a configuration of the pixel array area of FIG. 3, and FIG. 5 is a circuit diagram of the pixel array of FIG. 3. FIGS. 3 to 5 show only a single unit pixel group array (i.e., unit pixel group array PA1) by way of example. However, the pixel array may include a plurality of unit pixel group arrays.

Referring to FIG. 3, the pixel array includes a plurality of unit pixel group (also called 'the pixel group'), the unit pixel group array PA1 may include a plurality of sub-pixel groups TGG1, TRG, TBG, and TGG2 arranged in a Bayer pattern. The sub-pixel groups may correspond to different colors, for example, first green, red, blue, and second green.

According to some example embodiments, the sub-pixel groups may include sub-pixels PG1, PR, PB, and PG2. The plurality of sub-pixels PG1, PR, PB, and PG2 may be arranged in two dimensions. For example, the plurality of sub-pixels PG1, PR, PB, and PG2 may be repeatedly arranged in the first direction and the second direction. The sub-pixels PG1, PR, PB, and PG2 may be arranged to be spaced from each other by a constant spacing.

The unit pixel group array PA1 may be composed of the sub-pixel groups arranged in a certain pattern. When the number of sub-pixels per sub-pixel group is 4, the pixel may be referred to as a Tetra pixel. When the number is 9, the pixel may be referred to as a Nona pixel. When the number is 16, the pattern may be referred to as a Tetra$^2$ pixel. Because the illustrated unit pixel group array PA1 includes 16 sub-pixels in one sub-pixel group, the pixel may be a Tetra$^2$ pixel.

According to some example embodiments, the unit pixel group array PA may be arranged in a Bayer pattern and a Tetra$^2$ pattern. For example, one sub-pixel group may be composed of a 4×4 sub-pixels, that is, 16 sub-pixels arranged in 4 rows and 4 columns (4×4 array). According to some example embodiments, the sub-pixel group may include all sub-pixels of the same color. According to some example embodiments, the sub-pixel group may include at least one, that is, a small number of sub-pixels of different colors, and the remaining sub-pixels having the same color.

For example, the unit pixel group array PA1 may include a first green sub-pixel group TGG, a red sub-pixel group TRG, a blue sub-pixel group TBG, and a second green sub-pixel group TGG2 arranged in a first pattern. In the illustrated example, each sub-pixel group may include 16 sub-pixels, that is, Tetra$^2$ pixels.

In the example shown, the first green sub-pixel group TGG1 may include first to sixteenth (Tetra$^2$) green sub-pixels G1 to G16. The red sub-pixel group TRG may include first to sixteenth (Tetra$^2$) red sub-pixels R1 to R16. The blue sub-pixel group TBG may include first to sixteenth (Tetra$^2$) blue sub-pixels B1 to B16. The second green sub-pixel group TGG2 may include seventeenth to thirty-second (Tetra$^2$) green sub-pixels G17 to G32.

Referring to FIGS. 3 and 4, the pixel array PA1 may include a micro lens layer a ML layer, a color filter layer a CF layer, and an interpixel light-blocking layer, such as a deep trench isolation (DTI) layer in this order downwardly arranged from a top face.

According to some example embodiments, at least two types of micro lens ML1 and ML2 may be disposed on each of the sub-pixel groups, including the red sub-pixel group TRG including red sub-pixels R1 to R16, the first green sub-pixel group TGG1 and the second green sub-pixel group TGG2 including green sub-pixels G1 to G32, and the blue sub-pixel group TBG including blue sub-pixels B1 to B16. A single micro lens ML1 may be disposed on top of an individual sub-pixel area. According to some example embodiments, the single micro lens ML1 may be disposed on top of each of sub-pixels belonging to an outer area of the sub-pixel group, while two shared micro lenses ML2 may be disposed on top of sub-pixels belonging to an inner area except for the outer area of the sub-pixel group. For example, a single micro lens may be disposed on each of the sub-pixels G1, G2, G3, G4, G5, G8, G9, G12, G13, G14, G15 and G16 in the outer area in the first green sub-pixel group TGG1. A first shared micro lens may be disposed on sub-pixels G6 and G7 in a second sub-row in the inner area in the first green sub-pixel group TGG1 while a second shared micro lens may be disposed on sub-pixels G10 and G11 in a third sub-row in the inner area in the first green sub-pixel group TGG1. In this case, each of the first shared micro lens and the second shared micro lens may have an elliptical shape.

That is, in a top view, each single micro lens ML1 may correspond to one of the sub-pixel areas R1 to R5, R8, R9, R12 to R16, G1 to G5, G8, G9, G12 to G21, G24, G25, G28 to G32, B1 to B5, B8, B9 and B12 to B16. Each shared micro lens ML2 may be disposed on a top face of a pair of two sub-pixel areas, for example, a shared micro lens ML2 may be disposed on each of pairs of G6:G7, G10:G11, B6:B7, B10:B11, R6:R7, R10:R11, G22:G23, and G26:G27. Each single micro lens may be disposed on an individual sub-pixel and may not be shared by two sub-pixels. The shared micro lens may be disposed on at least two adjacent sub-pixels and may be shared by adjacent sub-pixels, which may be activated independently or simultaneously. Thus, a phase may be detected based on a pixel value of a first sub-pixel (for example, G6) disposed under one side of the shared micro lens and a pixel value of a second sub-pixel (for example, G7) disposed under the other side of the shared micro lens, According to some example embodiments, a Tetra$^2$ color filter corresponding to each of the sub-pixels R1 to R16, G1 to G32, and B1 to B16 may be disposed. As shown, in each of the first to sixteenth (Tetra$^2$) green sub-pixels G1 to G16, a green color filter PG1 may be disposed between the micro lens layer and the light-blocking layer. In each of the first to sixteenth (Tetra$^2$) red sub-pixels R1 to R16, a red color filter PR may be disposed between the micro lens layer and the light-blocking layer. In each of the first to sixteenth (Tetra$^2$) blue sub-pixels B1 to B16, a blue color filter PB may be disposed between the micro lens layer and the light-blocking layer. In each of the seventeenth to thirty-second (Tetra$^2$) green sub-pixel G17 to G32, a green color filter PG2 may be disposed between the micro lens layer and the light-blocking layer. Light passing through a corresponding color filter may be converted to a pixel signal through a corresponding pixel group.

According to some example embodiments, each of the sub-pixel groups, including red sub-pixels R1 to R16, first and second green sub-pixels G1 to G32, and blue sub-pixels B1 to B16, may include at least two types of light-blocking layers. A first type light-blocking layer DTI1 may correspond to the first type micro lens, and may correspond to each of the sub-pixel areas R1 to R5, R8, R9, R12 to R16, G1 to G5, G8, G9, G12 to G21, G24, G25, G28 to G32, B1 to B5, B8, B9 and B12 to B16. A second type light-blocking layer DTI2 may correspond to the second type micro lens, and to a pair of two adjacent sub-pixel areas, for example, each of pairs of G6:G7, G10:G11, B6:B7, B10:B11, R6:R7, R10:R11, G22:G23, G26:G27. The second type light-blocking layer DTI2 has 2 type light-blocking structures corresponding to the second type micro lens ML2. For example, a first light-blocking structure between the G6 sub-pixel and the G7 sub-pixel (such as inner wall of ML2) in FIG. 3 has a low blocking wall, while a second light-blocking structure between the G5 and the G6 sub-pixels, between the G6 and the G2 sub-pixels, or between the G7 and the G3 sub-pixels, or between the G8 and G7 sub-pixels (such as outer wall of ML2) has a high blocking wall.

Referring to FIGS. 3 and 5, a sub-pixel group (TU) of the unit pixel group array PA1 (i.e., the first green sub-pixel group TGG1, the red sub-pixel group TRG, the blue sub-pixel group TBG or the second green sub-pixel group TGG2) may include a plurality of micro lenses ML, a plurality of floating diffusions FD1 to FD4, a plurality of photodiodes PD1 to PD16, a plurality of transfer transistors TT1 to TT16, a plurality of row lines ROW1a to ROW1d, ROW2a to ROW2c, ROW3a to ROW3c, and ROW4a to ROW4d, a plurality of column lines COL1 to COL4, etc. According to some example embodiments, each sub-pixel group TU may include four sub-rows ROWa to ROWd, four sub-columns COL1 to 4, and sub-pixels respectively disposed at intersections between the four sub-columns and four sub-rows. One sub-pixel includes one photodiode PD and one transfer transistor TT. Sub-pixels belonging to the same row in the sub-pixel group TU may share one floating diffusion FD. As used herein, the sub-pixel may be referred to as a Tetra$^2$ sub-pixel.

The plurality of sub-columns COL1 to COL4 and the plurality of sub-rows ROW1a to ROW1d, ROW2a to ROW2d, ROW3a to ROW3d, and ROW4a to ROW4d may constitute the sub-pixel group TU. The plurality of sub-columns COL1 to COL4 may extend in the second direction Y. The plurality of sub-rows ROW1a to ROW1d, ROW2a to ROW2d, ROW3a to ROW3d, and ROW4a to ROW4d may extend in the first direction X.

Each of the transfer transistors TT1 to TT16 of the sub-pixel group TU may be disposed at each of intersections between the plurality of sub-rows ROW1a to ROW1d, ROW2a to ROW2d, ROW3a to ROW3d, and ROW4a to ROW4d and the plurality of sub-columns COL1 to COL4. That is, each of the transfer transistors TT1 to TT16 of the sub-pixel group TU may connect each of the plurality of sub-rows ROW1a to ROW1d, ROW2a to ROW2d, ROW3a to ROW3d, and ROW4a to ROW4d and each of the plurality of sub-columns COL1 to COL4 to each other.

For example, when the sub-pixel group TU corresponds to the first green sub-pixel group TGG1, the G1 to G4 sub-pixels may share the floating diffusion FD1, the G5 to G8 sub-pixels may share the floating diffusion FD2, the G9 to G12 sub-pixels may share the floating diffusion FD3, and the G13 to G16 sub-pixels may share floating diffusion FD4. A pixel signal generated from sub-pixels belonging to each row may be transferred based on the floating diffusion FD.

A source and a drain of each of the green sub-pixel transfer transistors TT1 to TT4 may be connected to the first floating diffusion FD1. The first floating diffusion FD1 may be connected to the first column COL1. A source and a drain of each of the green sub-pixel transfer transistors TT5 to TT8 may be connected to the second floating diffusion FD2. The second floating diffusion FD2 may be connected to the second column COL2. A source and a drain of each of the green sub-pixel transfer transistors TT9 to TT12 may be connected to the third floating diffusion FD3. The third floating diffusion FD3 may be connected to the third column COL3. A source and a drain of each of the green sub-pixel transfer transistors TT13 to TT16 may be connected to the fourth floating diffusion FD4. The fourth floating diffusion FD4 may be connected to the fourth column COL4. However, example embodiments are not limited thereto. All of the sources and the drains of the green sub-pixel transfer transistors TT1 to TT16 may be connected to one floating diffusion FD.

The transfer transistors (for example, TT1 to TT4) belonging to the same row may be turned on/off so as to have exposure times that do not overlap each other. At least two sub-pixels belonging to the same row may be turned on/off so as to have exposure times at the same time. The pixel signal may be output at different times according to different exposure times. In this regard, the pixel signal may be a pixel signal based on charges accumulated in at least one of the photodiode PD1 to the photodiode PD4. Further, although not illustrated, the pixel signal may be output to a readout circuit via a source follower transistor. The above description has been mainly based on the green sub-pixel. However, the same principle may be equally applied to the red sub-pixel group and the blue sub-pixel group.

Hereinafter, a pattern of the image sensor 100 and a phase detection method will be described with reference to FIGS. 6 to 20.

Figure 6:
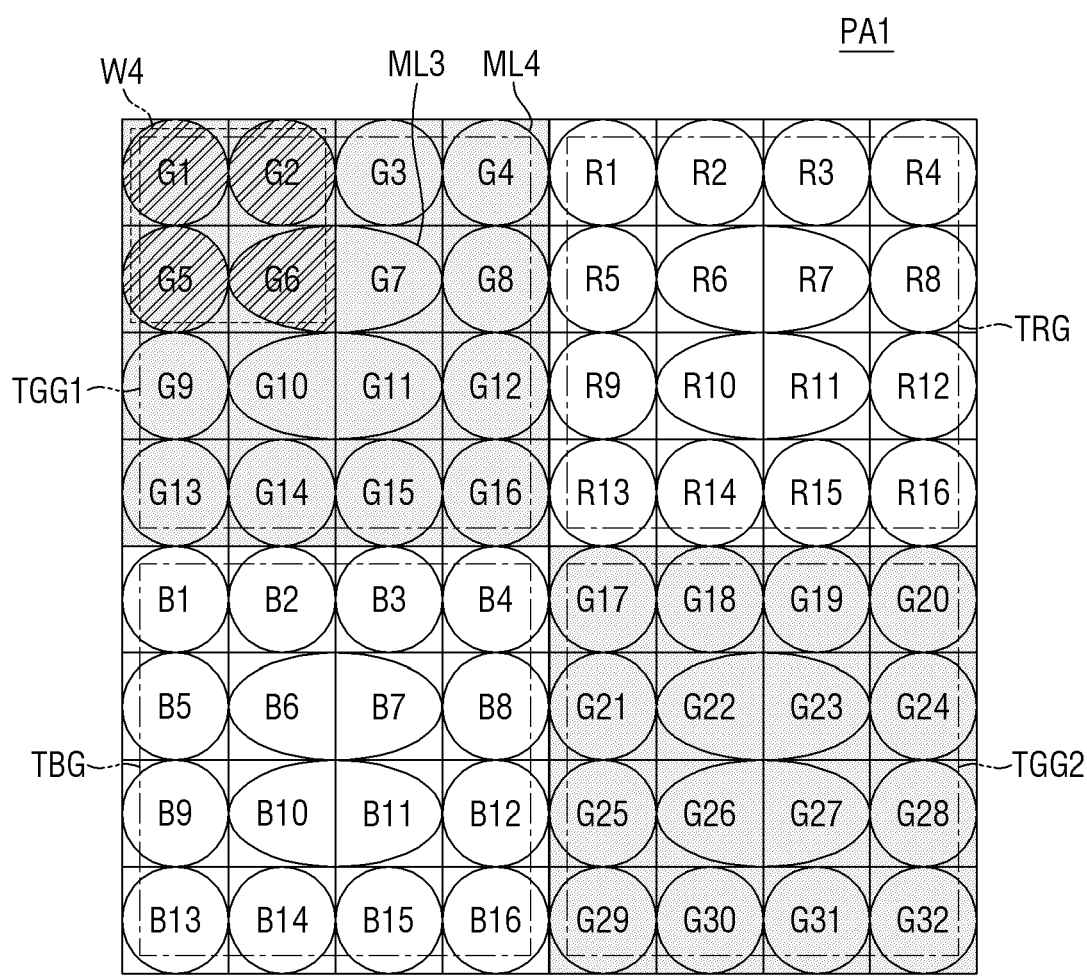
FIGS. 6 and 7 are diagrams to illustrate a phase detection method in a pixel array having the pattern of FIG. 3 according to some example embodiments.
Figure 7:
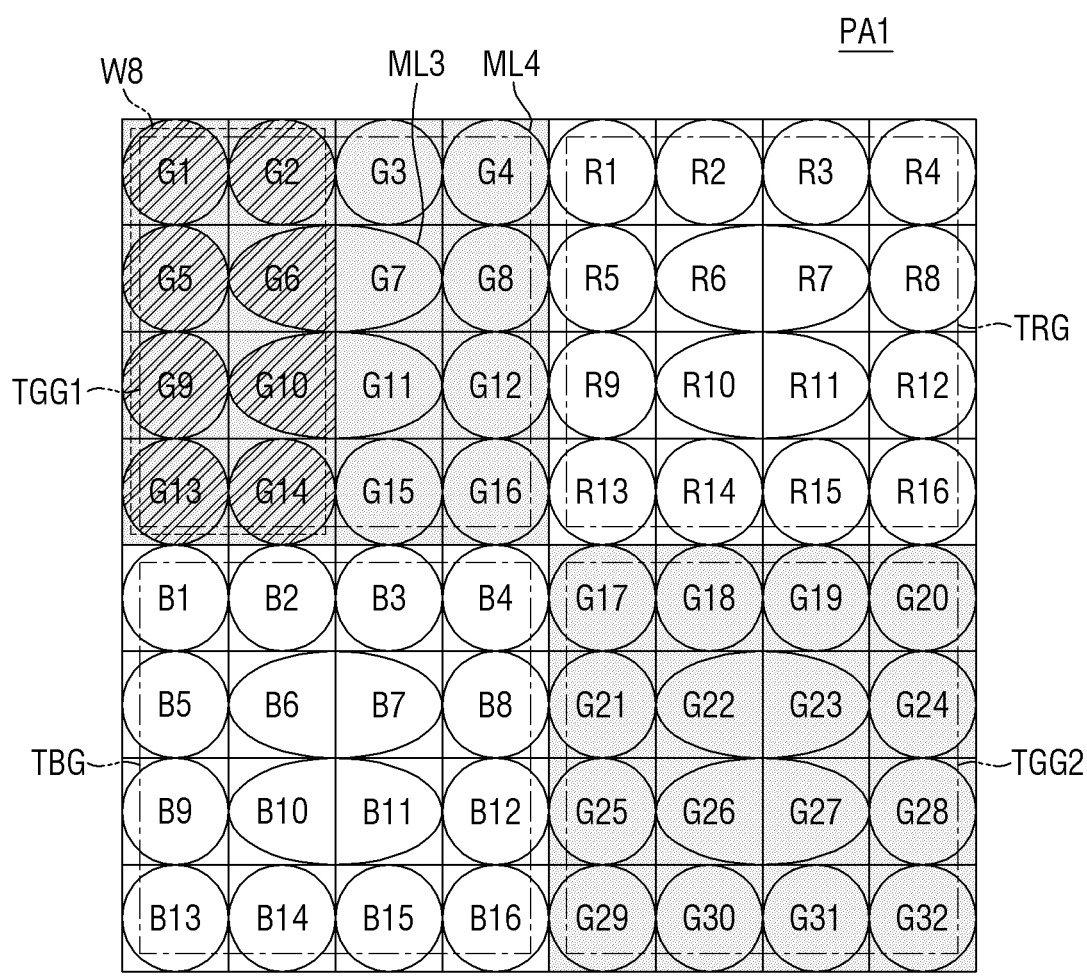

FIGS. 6 and 7 are diagrams to illustrate a phase detection method in a pixel array having the pattern of FIG. 3 according to some example embodiments.

Referring to FIG. 6, according to some example embodiments, a readout area W4 may have a rectangular shape including four sub-pixels. For convenience of description, the illustrated readout area W4 may be referred to as a 4 shared readout area.

In the illustrated example, in a sub-pixel group (for example, TGG1) arranged in a Tetra$^2$ layout structure, the readout circuit may perform four readout operations. For example, the G1, G2, G5, and G6 sub-pixels may be read in a first readout operation, the G3, G4, G7, and G8 sub-pixels may be read in a second readout operation, the G9, G10, G13, and G14 sub-pixels may be read in a third readout operation, and the G11, G12, G15, and G16 sub-pixels may be read in a fourth readout operation. When the first to fourth readout operations are performed sequentially, a phase value may be detected based on a difference between a pixel value at the G6 sub-pixel and a pixel value at the G7 sub-pixel that are incident through the shared micro lens ML3, and a difference between a pixel value in the G10 sub-pixel and the pixel value at the G11 sub-pixel which are incident through the shared micro lens ML3.

Similarly, each of the red sub-pixel group TRG, the blue sub-pixel group TBG and the second green sub-pixel group TGG2 may be read based on the 4 shared readout area according to the scheme described above. A phase value may be detected based on a difference between a pixel value sensed at a sub-pixel at one side (for example, a left side of the shared micro lens) through the shared micro lens ML3 and a pixel value sensed at a sub-pixel at the other side (for example, a right side of the shared micro lens) through the shared micro lens ML3. For example, regarding the red sub-pixel group TRG, a pixel value of the R6 sub-pixel may be read in a first readout operation, a pixel value of the R7 sub-pixel may be read in a second readout operation, a pixel value of the R10 sub-pixel may be read at a third readout operation, and a pixel value of the R11 sub-pixel may be read at a fourth readout operation. Then, a phase value may be detected based on a difference between the pixel values of the sub-pixels R6 and R7 and a difference between the pixel values of the sub-pixels R10 and R11.

Referring to FIG. 7, according to some example embodiments, a readout area W8 may have a rectangular shape including 8 sub-pixels. For convenience of description, the illustrated readout area W8 may be referred to as an 8 shared readout area.

In the illustrated example, in a sub-pixel group (for example, TGG1) arranged in a Tetra$^2$ layout structure, the readout circuit may perform two readout operations. For example, the G1, G2, G5, G6, G9, G10, G13, and G14 sub-pixels may be read at a first readout operation, and the G3, G4, G7, G8, G11, G12, G15, and G16 sub-pixels may be read at a second readout operation. When the first readout operation and the second readout operation are performed sequentially, a phase value may be detected based on a difference between a pixel value at the G6 sub-pixel and a pixel value at the G7 sub-pixel that are incident through the shared micro lens ML3 in a second row, and a difference between a pixel value at the G10 sub-pixel and a pixel value in the G11 sub-pixel which are incident through the shared micro lens ML3 in a third row.

Similarly, each of the red sub-pixel group TRG, the blue sub-pixel group TBG and the second green sub-pixel group TGG2 may be read based on the 8 shared readout area according to the scheme described above. A phase value may be detected based on a difference between a pixel value sensed at a sub-pixel at one side (for example, a left side of the shared micro lens) through the shared micro lens ML3 in the first readout operation and a pixel value sensed at a sub-pixel at the other side (for example, a right side of the shared micro lens) through the shared micro lens ML3 in the second readout operation. For example, regarding the red sub-pixel group TRG, the pixel values of the R6 and R10 sub-pixels may be read out the first readout operation and the pixel values of the R7 and R11 sub-pixels may be read out in the second readout operation. Then, a phase value may be detected based on a difference between the pixel values of the R6 and R7 sub-pixels, and a difference between the pixel values of the R10 and R11 sub-pixels.

Figure 8:
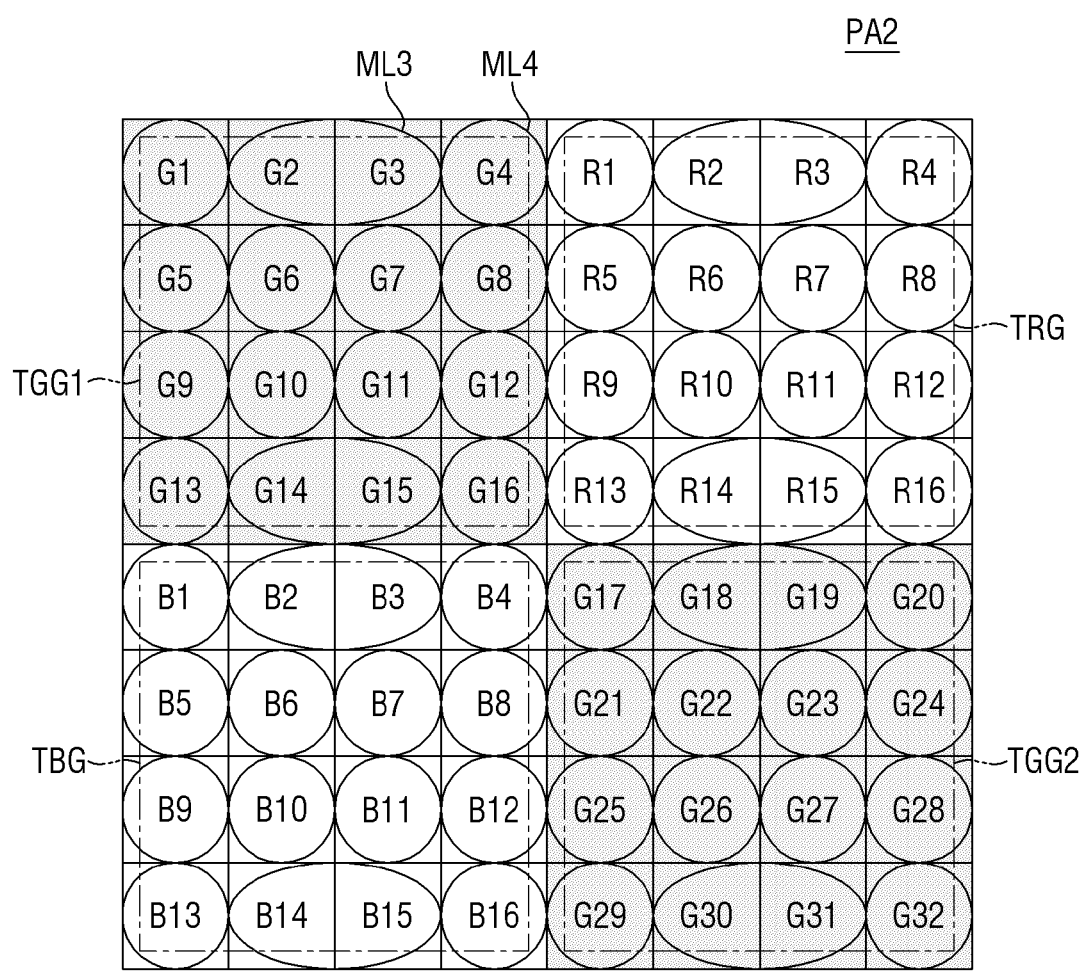
FIG. 8 is a diagram showing a pattern of a pixel array according to some example embodiments.

FIG. 8 is a diagram showing a pattern of a pixel array according to some example embodiments. In FIG. 8, descriptions that are duplicate with those based on FIG. 3 are omitted.

Referring to FIG. 8, according to some example embodiments, at least two types of micro lenses ML3 and ML4 may be disposed in each of the sub-pixels R1 to R16, G1 to G32, and B1 to B16. The shared micro lens ML3 may be disposed in an inner region of each of a first row and a fourth row of the sub-pixel group.

Specifically, taking the first green sub-pixel group TGG1 as an example, the first shared micro lens ML3 may be disposed on the G2 and G3 sub-pixels respectively at a second column and a third column in a first row. The first shared micro lens ML3 may be disposed on the G14 and G15 sub-pixels respectively at a second column and a third column in a fourth row. That is, the shared micro lens of FIG. 8 may be disposed in a portion of the outer area of the sub-pixel group intersecting a boundary line of the readout area. For example, regarding 4 shared readout, a first readout area includes the G1, G2, G5, and G6 sub-pixels, and a second readout area includes the G3, G4, G7, and G8 sub-pixels. The first shared micro lens ML3 intersects a boundary line of each of the first readout area and the second readout area. Further, a third readout area includes the G9, G10, G13, and G14 sub-pixels, and a fourth readout area includes the G11, G12, G15, and G16 sub-pixels. The second shared micro lens ML3 intersects a boundary line of each of the third readout area and the fourth readout area. A single micro lens is disposed on each of the remaining sub-pixels except for the G1, G2, G5, and G6 sub-pixels and the G3, G4, G7, and G8 sub-pixels in the sub-pixel group.

The at least two types of micro lens ML3 and ML4 may be arranged in each of the red sub-pixel group TRG, the blue sub-pixel group TBG and the second green sub-pixel group TGG2 in the same arrangement manner as described above in which the at least two types of micro lens ML3 and ML4 are arranged in the first green sub-pixel group TGG1.

Figure 9:
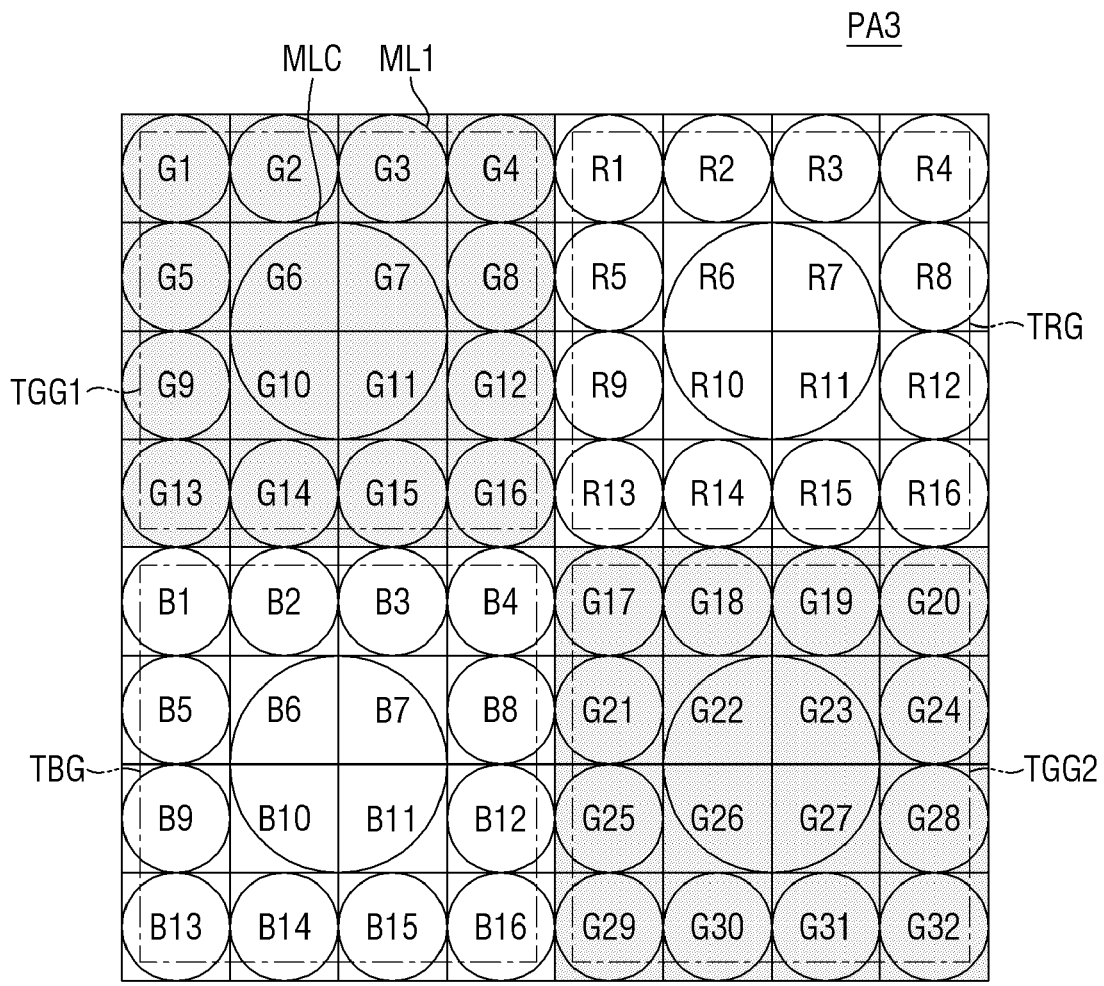
FIG. 9 is a view showing a pattern of a pixel array according to some example embodiments.

FIG. 9 is a view showing a pattern of a pixel array according to some example embodiments.

Referring to FIG. 9, one shared micro lens MLC and a single micro lens ML1 may be disposed on each of the sub-pixels R1 to R16, G1 to G32, and B1 to B16 according to some example embodiments. The shared micro lens MLC may be arranged in the inner area of the sub-pixel group. Alternatively, the shared micro lens MLC may be disposed on a boundary line of the 4 shared readout area or on a boundary line of the 8 shared readout area. That is, the arrangement of the micro lenses in adjacent readout areas to each other may be line symmetric with respect to the boundary line between the adjacent readout areas, while the arrangement of the micro lenses of the sub-pixels within one readout area may be asymmetric.

According to some example embodiments, the single micro lens ML1 may be disposed on each of the sub-pixels belonging to the outer area of the sub-pixel group. One shared micro lens MLC may be disposed on a combination of the sub-pixels belonging to the inner area except for the outer area in the sub-pixel group. The shared micro lens MLC may have a full circular shape. That is, in a top view, the single micro lens ML1 may correspond to each of the sub-pixels R1 to R5, R8, R9, R12 to R16 or G1 to G5, G8, G9, G12 to G16, or B1 to B5, B8, B9, B12 to B16 or G17 to G21, G24, G25, G28 to G32. In the above example, the shared micro lens MLC may correspond to a combination of 4 sub-pixels, for example, a combination of G6, G7, G10, and G11 or a combination of R6, R7, R10, and R11 or a combination of B6, B7, B10, and B11 or a combination of G22, G23, G26, and G27.

According to some example embodiments, a lower pixel structure of the unit pixel group array may include the color filter layer a CF layer, and the inter-pixel light-blocking layer a DTI layer as described in FIG. 4 above. For example, the inter-pixel light-blocking layer corresponding to the shared micro lens may have a wall having a smaller vertical dimension, while the inter-pixel light-blocking layer between a single micro lens and a single micro lens or between a single micro lens and a shared micro lens may have a wall having a larger vertical dimension.

Figure 10:
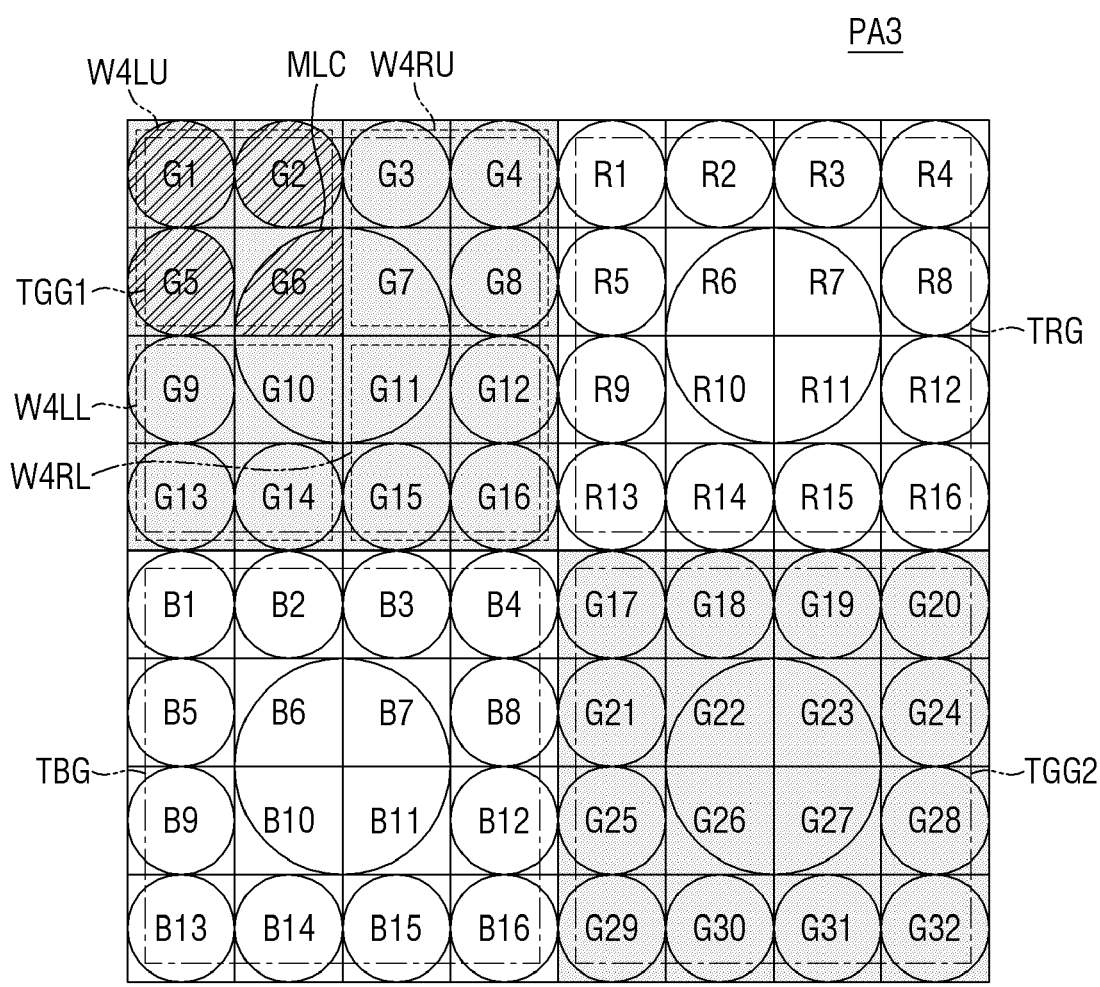
FIGS. 10 and 11 are diagrams to illustrate a phase detection method in the pixel array having the pattern of FIG. 9 according to some example embodiments.
Figure 11:
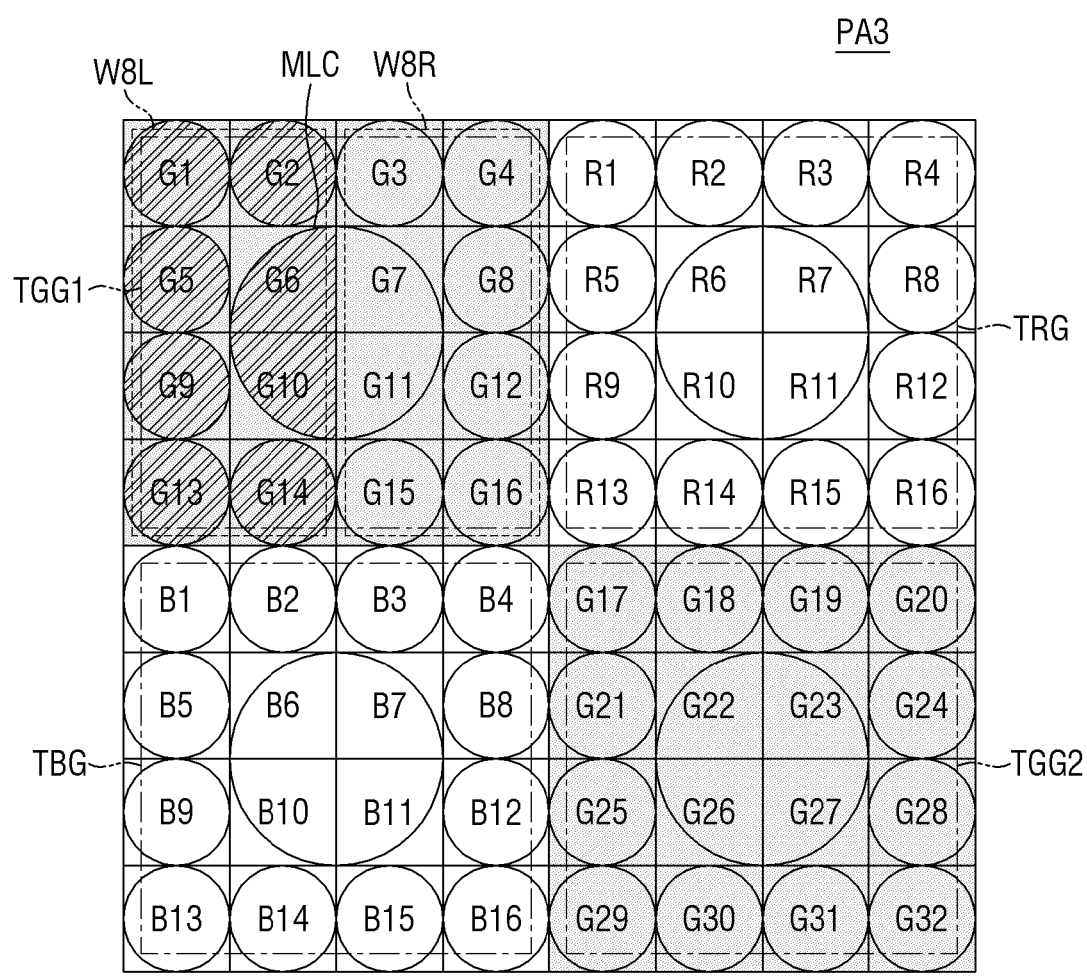

FIGS. 10 and 11 are diagrams to illustrate a phase detection method in the pixel array having the pattern of FIG. 9 according to some example embodiments.

Referring to FIG. 10, in the illustrated example, in a sub-pixel group (for example, TGG1) arranged in a Tetra² layout structure, the readout circuit may perform 4 readout operations based on the 4 shared readout area. For example, the G1, G2, G5, and G6 sub-pixels may be read in the first readout operation (W4LU), the G3, G4, G7, and G8 sub-pixel may be read in the second readout operation (W4RU). The G9, G10, G13, and G14 sub-pixels may be read in the third readout operation (W4LL). The G11, G12, G15, and G16 sub-pixels may be read in the fourth readout operation (W4RL). When the first to fourth readout operations are sequentially performed, the phase value may be detected based on differences between the pixel values of the G6 sub-pixel, the G7 sub-pixel, the G10 sub-pixel, and the G11 sub-pixel incident through the shared micro lens MLC. For example, the phase value may be detected based on a difference between the pixel values sensed the G6 and G7 sub-pixels, a difference between the pixel values sensed at the G10 and G11 sub-pixels, a difference between the pixel values sensed at the G6 and G10 sub-pixels, or a difference between the pixel values sensed at the G7 and G11 sub pixels.

Similarly, each of the red sub-pixel group TRG, the blue sub-pixel group TBG and the second green sub-pixel group TGG2 may be read based on the 4 shared readout area according to the same scheme as described above. A phase value may be detected based on differences between the pixel values of the four sub-pixels located in the inner area through the shared micro lens MLC.

Referring to FIG. 11, in the illustrated example, in a sub-pixel group (for example, TGG1) arranged in a Tetra² layout structure, the readout circuit may perform two readout operations based on the 8 shared readout area. For example, the G1, G2, G5, G6, G9, G10, G13, and G14 sub-pixels may be read in a first readout operation (W8L). The G3, G4, G7, G8, G11, G12, G15, and G16 sub-pixels may be read in a second readout operation (W8R). When the first and second readout operations are sequentially performed, the phase value may be detected based on a difference between the pixel values of the G6 and G7 sub-pixels incident through the shared micro lens MLC and a difference between the pixel values of the G10 and G11 sub-pixels incident through the shared micro lens MLC.

Similarly, each of the red sub-pixel group TRG, the blue sub-pixel group TBG and the second green sub-pixel group TGG2 may be read based on the 8 shared readout area according to the same scheme as described above. The phase value may be detected based on differences between the pixel values of the four sub-pixels located in the inner area through the shared micro lens MLC.

Figure 12:
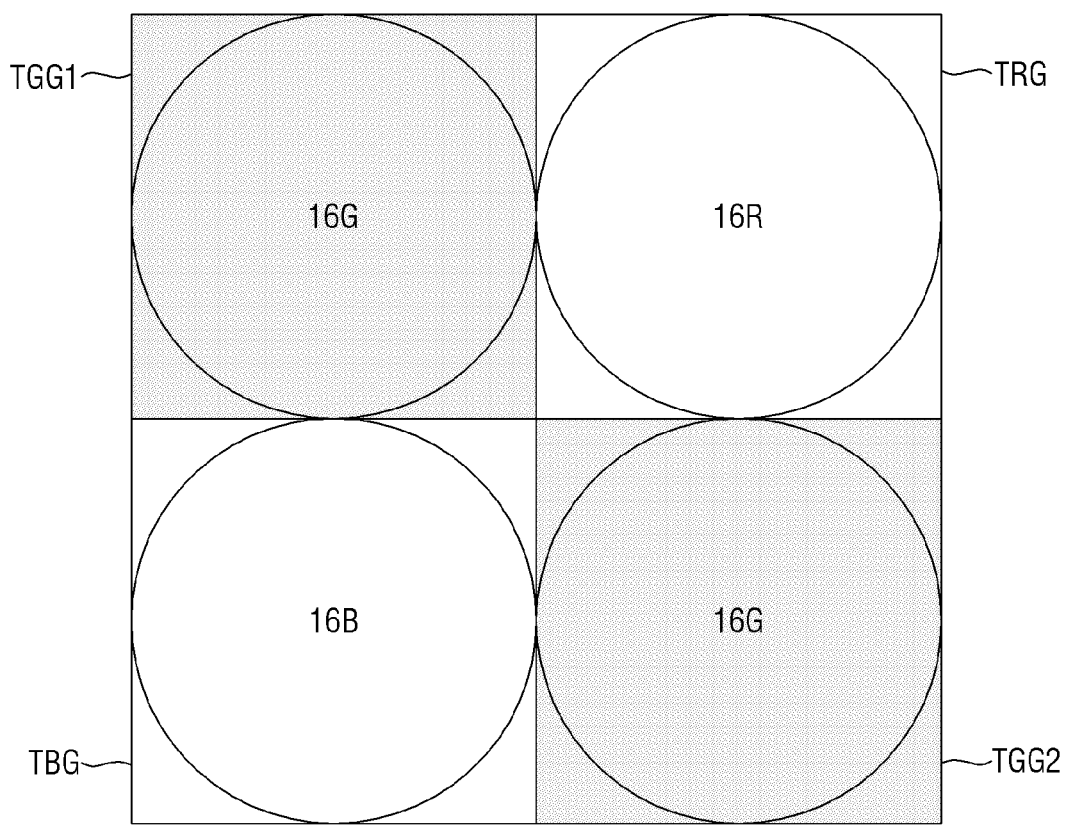
FIGS. 12 to 14 are diagrams to illustrate a phase detection method and a color detection method in the pixel arrays having the patterns of FIGS. 3, 8 and 9, respectively.
Figure 13:
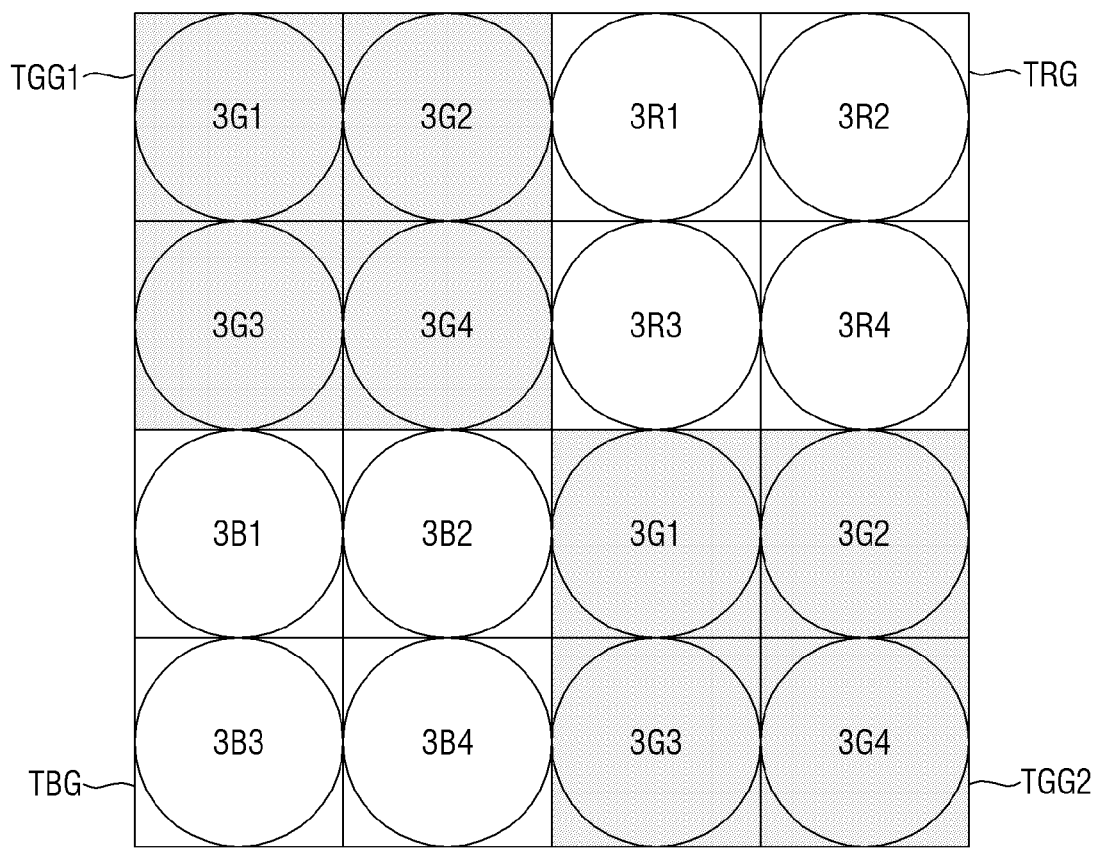
Figure 14:
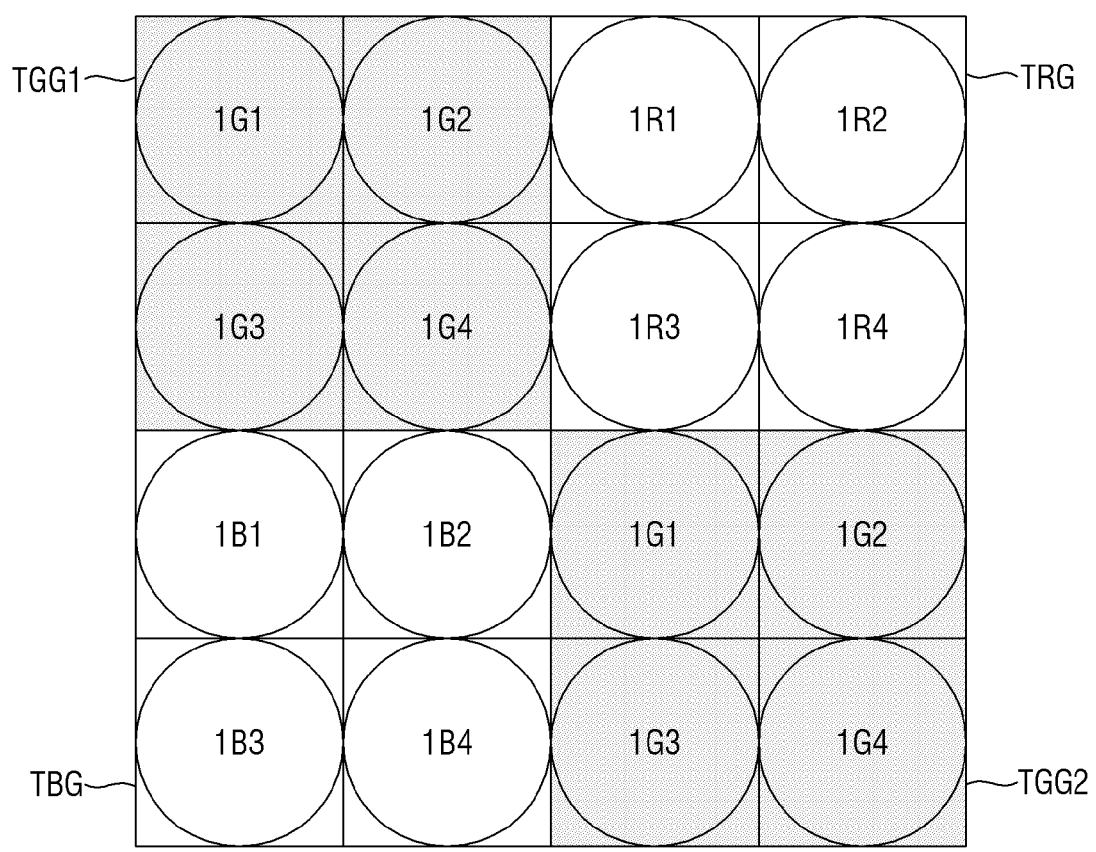

FIGS. 12 to 14 are diagrams to illustrate a phase detection method and a color detection method in the pixel arrays having the patterns of FIG. 3, FIGS. 8 and 9, respectively. When binning the sub-pixels in the unit pixel group array according to some example embodiments, a binned phase value and a binned color value are shown in each of FIGS. 12 to 14.

Referring to FIG. 12, according to some example embodiments, when binning the phase values of all sub-pixels within each of the sub-pixel groups in the unit pixel group array (for example, PA3) shown in each of FIG. 3, FIG. 8, or FIG. 9, a binned phase value corresponding to each of the sub-pixel groups TGG1, TRG, TBG, and TGG2 may be calculated. For example, in the sub-pixel group TGG1, a binned phase value corresponding to 16G may be calculated. In the sub-pixel group TRG, a binned phase value corresponding to 16R may be calculated. In the sub-pixel group TBG, a binned phase value corresponding to 16B may be calculated. In the sub-pixel group TGG2, a binned phase value corresponding to 16G may be calculated. That is, the unit pixel group array P-PA3 may have the binned phase values corresponding to 16G, 16R, 16B, and 16G, respectively.

Referring to FIG. 13, according to some example embodiments, when binning color values of the sub-pixels of the readout area (for example, the 4 shared readout area) within each of the sub-pixel groups, color values from the remaining sub-pixels except for the sub-pixels corresponding to the shared micro lens in each of the sub-pixel groups TGG1, TRG, TBG, and TGG2 may be binned and thus, binned color values may be calculated. For example, in FIG. 8 and FIG. 13, in the sub-pixel group TGG1, binned color values 3G1, 3G2, 3G3, and 3G4 based on the remaining sub-pixels (for example, G1-G5-G6, G4-G6-G7, G9-G10-G13, G11-G12-G15) except for the G2, G3, G14, and G15 sub-pixels in the 4 shared readout areas may be calculated, respectively. In the sub-pixel group TRG, binned color values 3R1, 3R2, 3R3, and 3R4 based on the remaining sub-pixels (for example, R1-R5-R6, R4-R6-R7, R9-R10-R13, R11-R12-R15) except for the R2, R3, R14, and R15 sub-pixels in the 4 shared readout units may be calculated, respectively. In the sub-pixel group TBG, binned color values 3B1, 3B2, 3B3, and 3B4 based on the remaining sub-pixels (for example, B1-B5-B6, B4-B6-B7, B9-B10-B13, B11-B12-B15) except for the B2, B3, B14, and B15 sub-pixels in the 4 shared readout area may be calculated, respectively. In the sub-pixel group TGG2, binned color values 3G1, 3G2, 3G3, and 3G4 based on the remaining sub-pixels (for example, G17-G21-G22, G20-G23-G24, G25-G26-G29, G27-G28-G32) except for the G18, G19, G30, and G31 sub-pixels in the 4 shared readout areas may be calculated, respectively.

Referring to FIG. 14, according to some example embodiments, in each of the sub-pixel groups TGG1, TRG, TBG, and TGG2, a binned phase value based on sub-pixels corresponding to the shared micro lens may be calculated. For example, in FIG. 11 and FIG. 14, in the sub-pixel group TGG1, binned phase values 1G1, 1G2, 1G3, and 1G4 based on the G6, G7, G10, and G11 sub-pixels in the 4 shared readout areas may be calculated, respectively. In the sub-pixel group TRG, binned phase values 1R1, 1R2, 1R3, and 1R4 based on the R6, R7, R10, and R11 sub-pixels in the 4 shared readout areas may be calculated, respectively. In the sub-pixel group TBG, binned phase values 1B1, 1B2, 1B3, ands 1B4 based on the B6, B7, B10, and B11 sub-pixels in the 4 shared readout areas may be calculated, respectively. In the sub-pixel group TGG2, binned phase values 1G1, 1G2, 1G3, and 1G4 based on the G22, G23, G26, and G27 sub-pixels in the 4 shared readout areas may be calculated, respectively.

Figure 15:
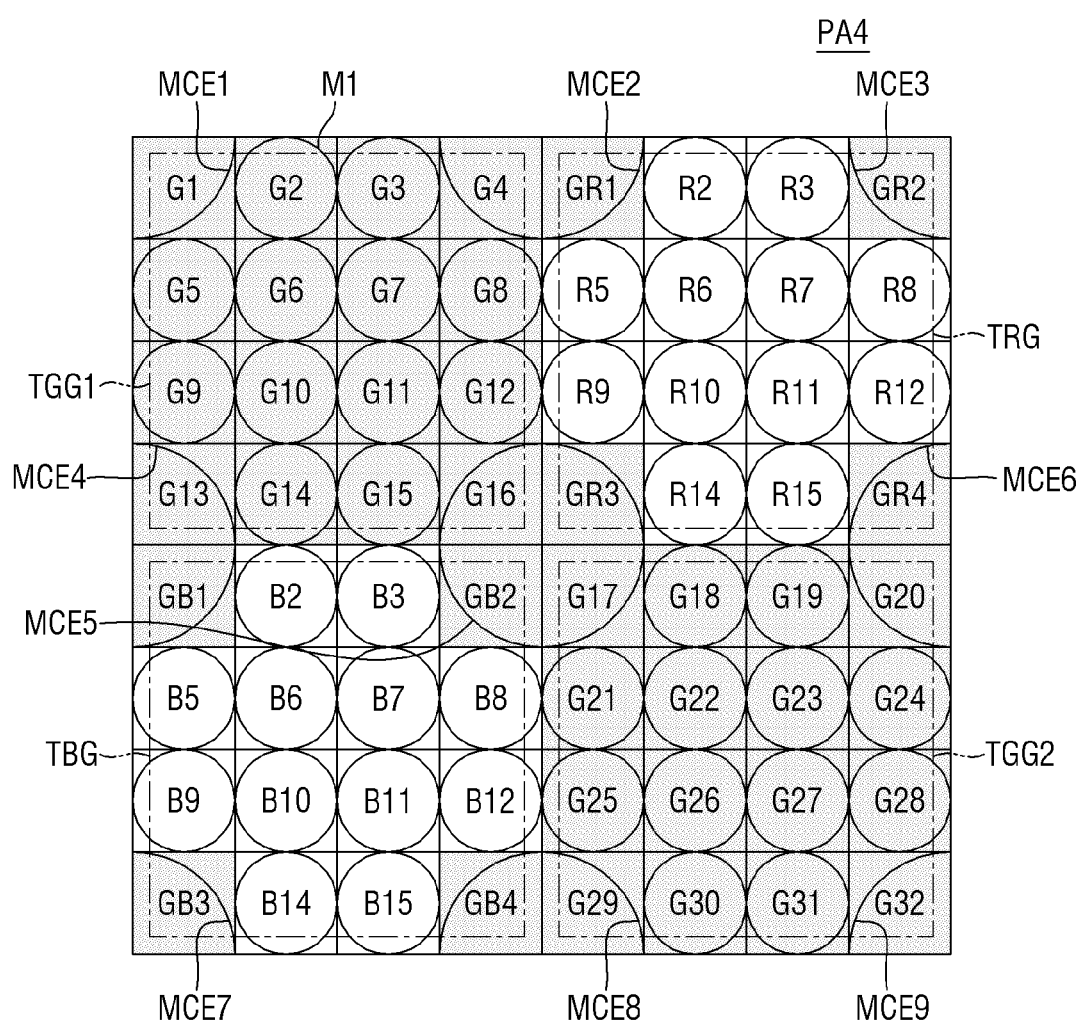
FIG. 15 is a diagram showing a pattern of a pixel array according to some example embodiments.

FIG. 15 is a diagram showing a pattern of a pixel array according to some example embodiments.

Referring to FIG. 15, four quarter micro lenses MCE and single micro lenses M1 may be disposed on each of the sub-pixels R1 to R16, G1 to G32, and B1 to B16 belonging to the unit pixel group array PA4 according to some example embodiments. A quarter micro lens MCE may be disposed at each corner of a sub-pixel group. A single micro lens M1 may be disposed on each of the remaining sub-pixels except for the corners in the sub-pixel group.

For example, in the sub-pixel group TGG1, quarter micro lens MCE1, MCE2, MCE4, and MCE5 may be respectively disposed on G1, G4, G13, and G16 sub-pixels. Each single micro lens M1 may be disposed on each of the remaining sub-pixels G2, G3, G5, G6, G7, G8, G9, G10, G11, G12, G14, and G15. An area of the four quarter micro lenses G1-MCE1, G4-MCE2, G13-MCE4, and G16-MCE5 respectively arranged at the four corners may be combined with each other to form an area of one circular shared micro lens. According to some example embodiments, when each of the sub-pixels has a square shape, and a single micro lens has a circular shape sized such that the circle touches the four sides of the sub-pixel, a radius of the quarter micro lens MCE may be equal to a length of one side of one sub-pixel, and a diameter of the circular shared micro lens MCE may be two times the diameter of the single micro lens M1.

The quarter micro lenses between adjacent sub-pixel groups may constitute one circular shared micro lens. For example, a quarter micro lens MCE5-G16 of the sub-pixel group TGG1, a quarter micro lens MCE5-GR3 of the sub-pixel group TRG, a quarter micro lens MCE5-GB2 of the sub-pixel group TBG, and a quarter micro lens MCE5-G17 of the sub-pixel group TGG2 may be combined with each other to constitute one circular shared micro lens MCE5.

However, unlike other unit pixel group arrays PA1, PA2, and PA3, in the unit pixel group array PA4 of FIG. 15, the sub-pixels corresponding to the quarter micro lens may be green sub-pixels. For example, the sub-pixels respectively at the corners of the sub-pixel group TRG may not be red sub-pixels but may be green sub-pixels GR1, GR2, GR3, and GR4. The remaining sub-pixels R2, R3, R5 to R12, R14, and R15 may be red sub-pixels. Further, the sub-pixels respectively at the corners of the sub-pixel group TBG may not be blue sub-pixels but may be green sub-pixels GB1, GB2, GB3, and GB4. The remaining sub-pixels B2, B3, B5 to B12, B14, and B15 may be blue sub-pixels.

Figure 16:
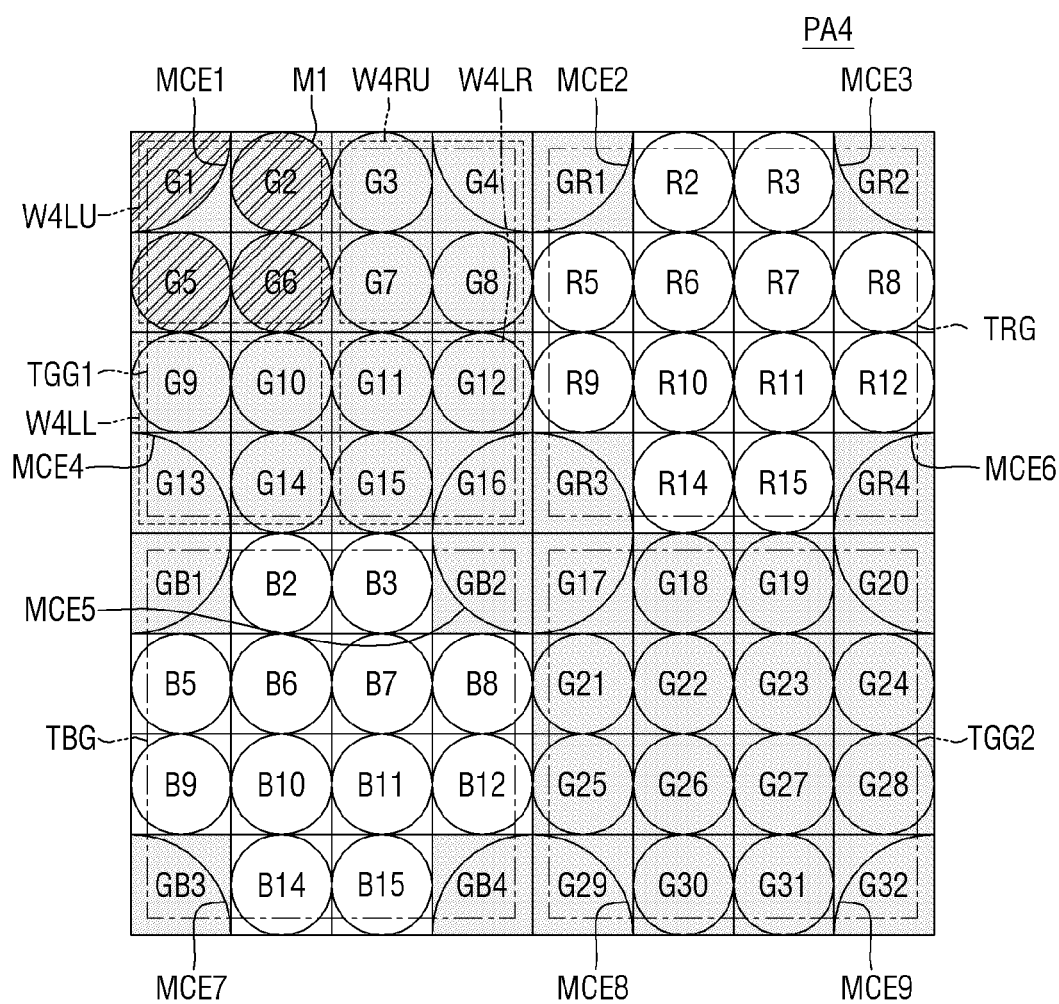
FIGS. 16 and 17 are diagrams to illustrate a phase detection method in the pixel array having the pattern of FIG. 15 according to some example embodiments.
Figure 17:
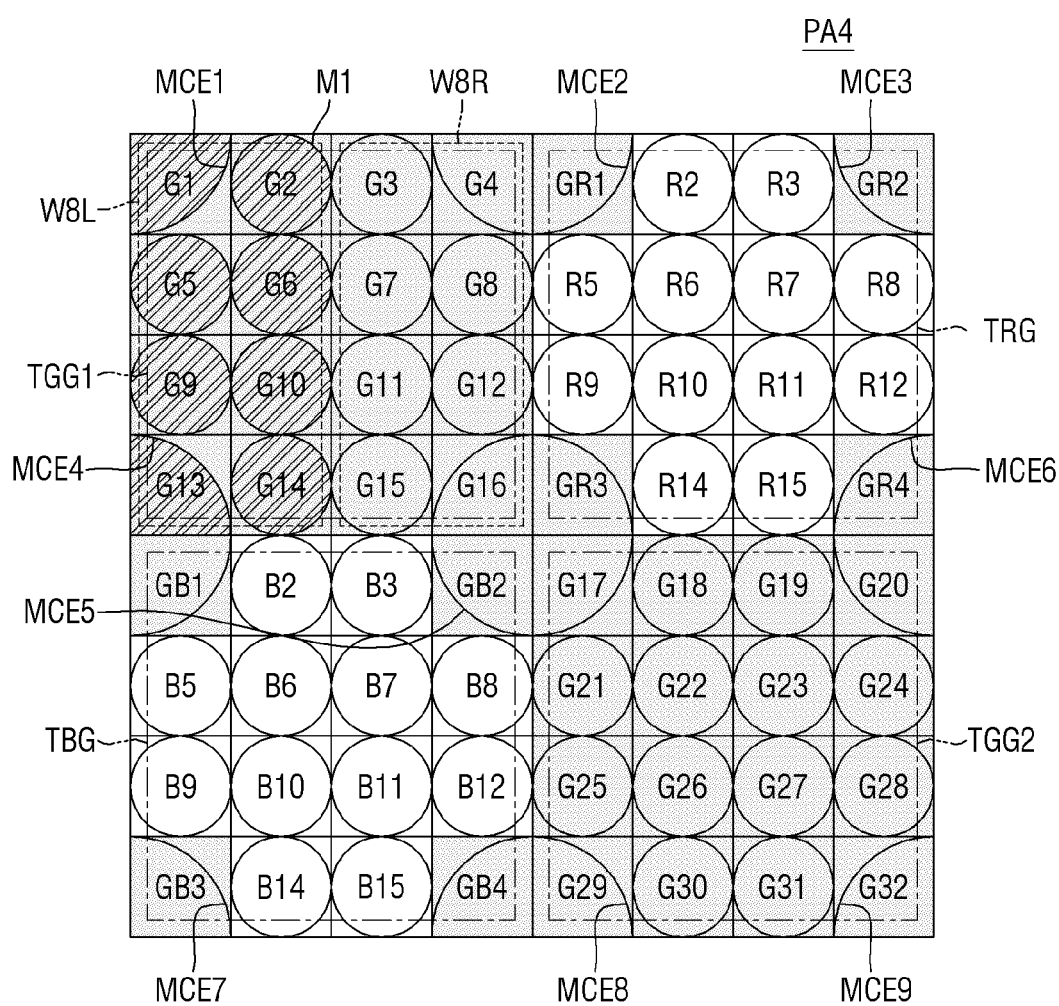

FIGS. 16 and 17 are diagrams to illustrate a phase detection method in the pixel array having the pattern of FIG. 15.

Referring to FIG. 16, in the illustrated example, in a sub-pixel group (for example, TGG1) arranged in a Tetra$^2$ layout structure, the readout circuit may perform 4 readout operations based on the 4 shared readout areas. For example, the G1, G2, G5, and G6 sub-pixels may be read at the first readout operation (W4LU), the G3, G4, G7, and G8 sub-pixels may be read at the second readout operation (W4RU), the G9, G10, G13, and G14 sub-pixels may be read at the third readout operation (W4LL), and the G11, G12, G15, and G16 sub-pixels may be read at the fourth readout operation (W4RL). When the first to fourth readout operations are sequentially performed, a phase value may be detected based on pixel values of the G1 sub-pixel, the G4 sub-pixel, the G13 sub-pixel, and the G16 sub-pixel incident through the quarter micro lenses MCE1, MCE2, MCE4 and MCE5. Because the quarter micro lens of the sub-pixel group TGG1 is asymmetrically arranged in each of the first readout area to the fourth readout area, a phase value may be detected based on a pixel value of the sub-pixel in which each quarter micro lens is disposed.

Similarly, each of the red sub-pixel group TRG, the blue sub-pixel group TBG and the second green sub-pixel group TGG2 may be read based on the 4 shared readout area according to the same scheme as described above. The phase value may be detected based on the pixel values of the 4 sub-pixels respectively located at the corners of each sub-pixel group through the quarter micro lens MCE.

Referring to FIG. 17, in the illustrated example, in a sub-pixel group (for example, TGG1) arranged in a Tetra$^2$ layout structure, the readout circuit may perform two readout operations based on the 8 shared readout area. For example, the G1, G2, G5, G6, G9, G10, G13, and G14 sub-pixels may be read at the first readout operation (W8L) and the G3, G4, G7, G8, G11, G12, G15, and G16 sub-pixels may be read at the second readout operation (W8R). When the first and second readout operations are sequentially performed, the phase value may be detected based on the pixel values of the G1 and G13 sub-pixels and the pixel values of the G4 and G16 sub-pixels incident through the quarter micro lens MCE.

Similarly, each of the red sub-pixel group TRG, the blue sub-pixel group TBG and the second green sub-pixel group TGG2 may be read based on the 8 shared readout area according to the same scheme as described above. The phase value may be detected based on the pixel values of the 4 sub-pixels respectively located at the corners of each sub-pixel group through the quarter micro lens MCE. However, according to some example embodiments, because the sub-pixel corresponding the quarter micro lens MCE is a green sub-pixel, phase value binning and color binning may be performed based on FIGS. 18 to 20 when binning the color values of the sub-pixels.

Figure 18:
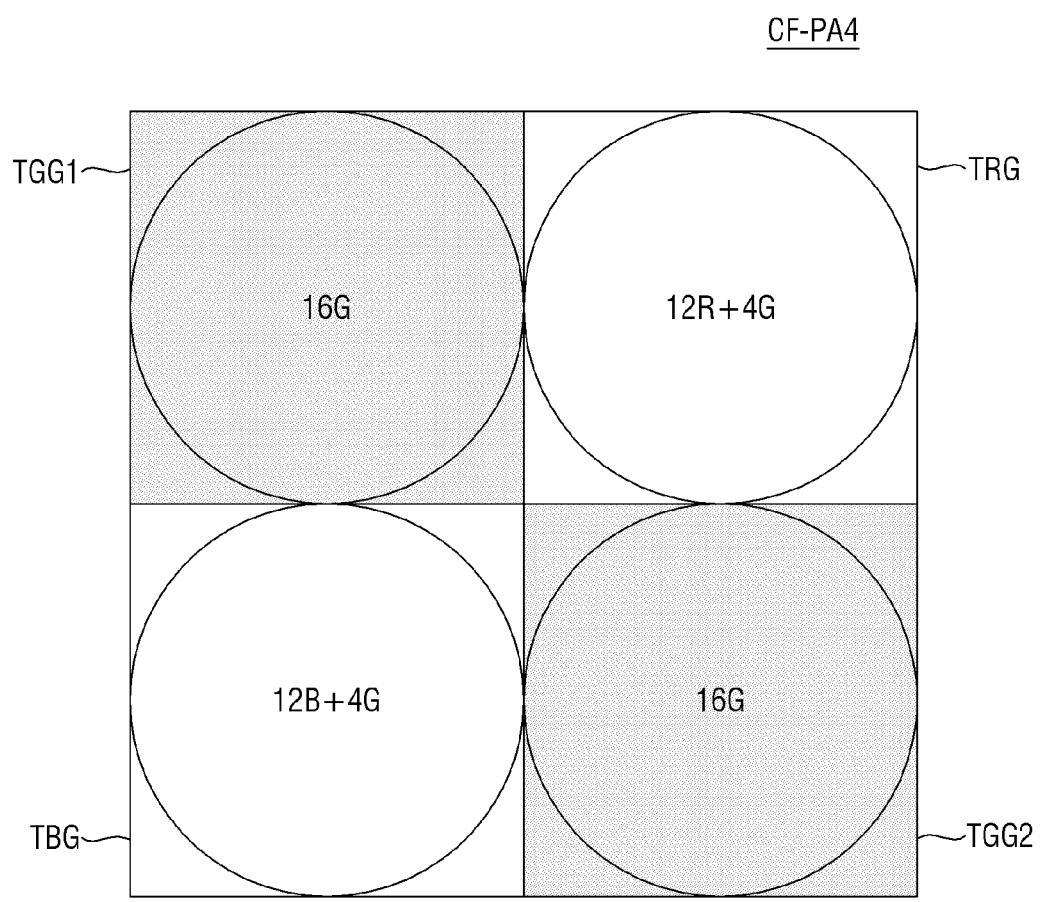
FIGS. 18 to 20 are diagrams to illustrate a phase detection method and a color detection method in the pixel array having the pattern of FIG. 15 according to some example embodiments.
Figure 19:
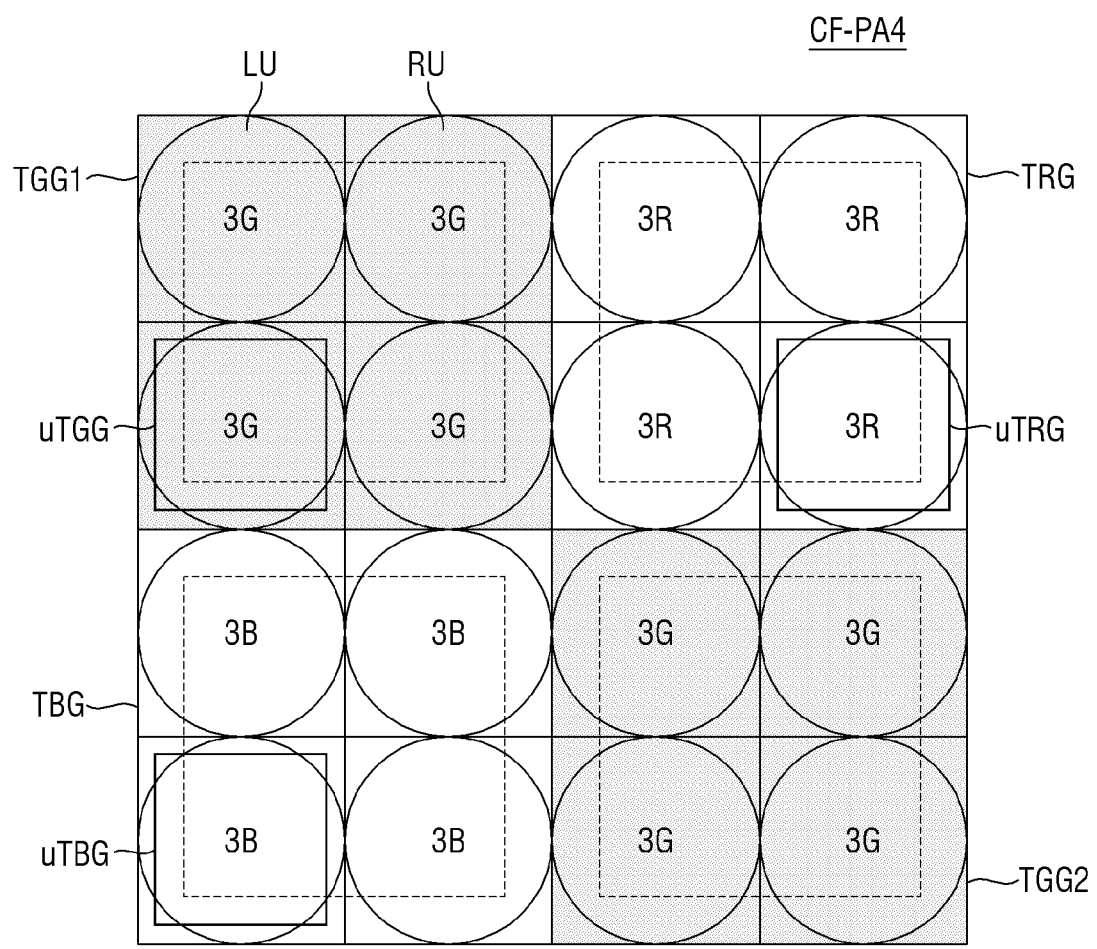
Figure 20:
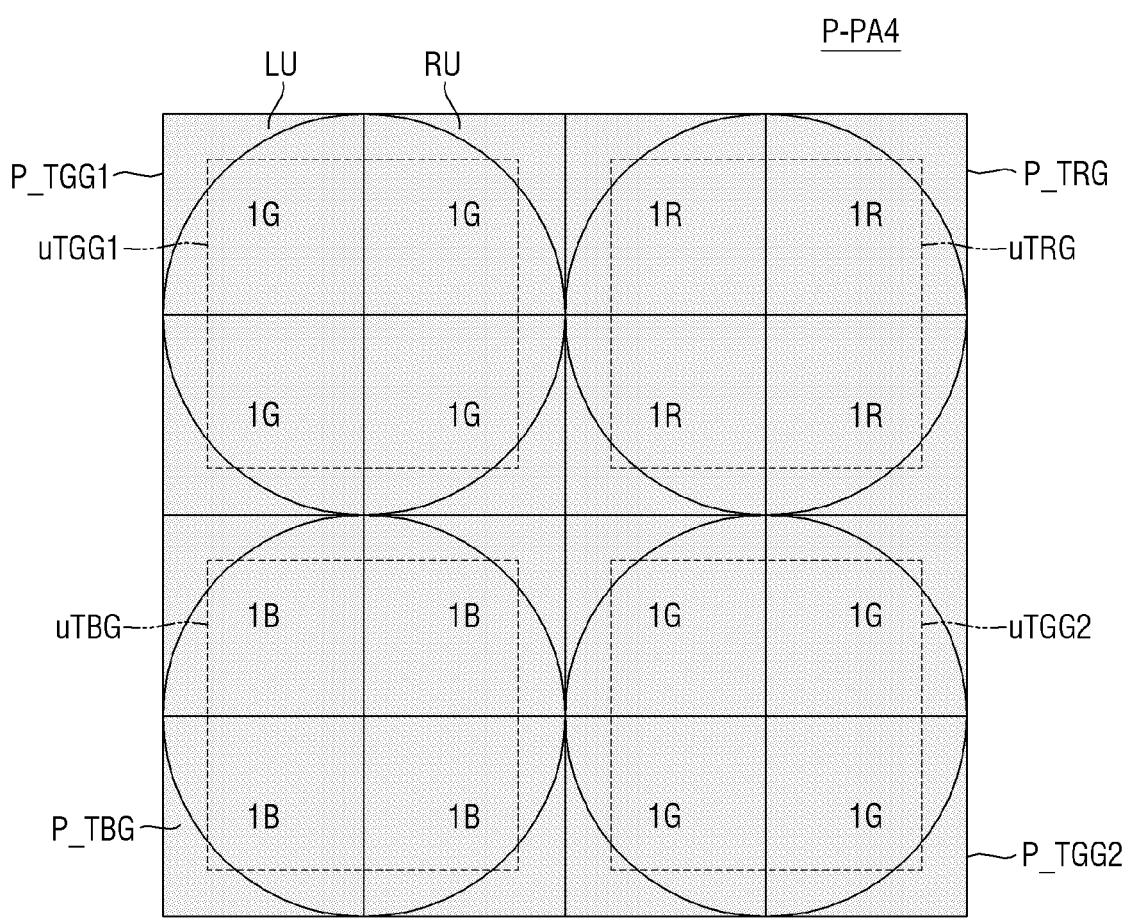

FIGS. 18 to 20 are diagrams to illustrate a phase detection method and a color detection method in the pixel array having the pattern of FIG. 15. When binning the sub-pixels in the unit pixel group array according to some example embodiments, the binned phase value and the binned color value are respectively shown in FIGS. 18 to 20.

Referring to FIG. 18, according to some example embodiments, all sub-pixels in the first green sub-pixel group TGG1 and the second green sub-pixel group TGG2 are green sub-pixels. Thus, when all the sub-pixels are binned with each other, the binned color value becomes 16G. However, in each of the red sub-pixel group TRG and the blue sub-pixel group TBG, the four sub-pixels at the corners are green sub-pixels. Thus, when color binning is performed, the binned color values in the red sub-pixel group TRG and the blue sub-pixel group TBG become 12R+4G and 12B+4G, respectively. The image sensor may change a parameter of a Color Correction Matrix (CCM) to correct the added green color value 4G in each of the red sub-pixel group TRG or the blue sub-pixel group TBG. The CCM may be expressed based on a following <Equation 1>.

$$\begin{bmatrix} R' \\ G' \\ B \end{bmatrix} = \begin{bmatrix} \alpha_{11} & \alpha_{12} & \alpha_{13} \\ \alpha_{21} & \alpha_{22} & \alpha_{23} \\ \alpha_{31} & \alpha_{32} & \alpha_{33} \end{bmatrix} \cdot \begin{bmatrix} 16 \cdot R \\ 16 \cdot G \\ 16 \cdot B \end{bmatrix} \qquad \text{Equation 1}$$

The above Equation 1 may be converted to a following Equation 2.

$$\begin{bmatrix} R' \\ G' \\ B \end{bmatrix} = \begin{bmatrix} \alpha_{11} & \alpha_{12} & \alpha_{13} \\ \alpha_{21} & \alpha_{22} & \alpha_{23} \\ \alpha_{31} & \alpha_{32} & \alpha_{33} \end{bmatrix} \cdot \begin{bmatrix} \frac{4}{3} & -\frac{1}{3} & 0 \\ 0 & 1 & 0 \\ 0 & -\frac{1}{3} & \frac{4}{3} \end{bmatrix} \cdot \begin{bmatrix} 12R + 4G \\ 16G \\ 12B + 4G \end{bmatrix} \qquad \text{Equation 2}$$

In the above Equation 1 and Equation 2, $$\begin{bmatrix} \alpha_{11} & \alpha_{12} & \alpha_{13} \\ \alpha_{21} & \alpha_{22} & \alpha_{23} \\ \alpha_{31} & \alpha_{32} & \alpha_{33} \end{bmatrix}$$

represents a weight of each of red, green, and blue colors.
In the above Equation 2, $$\begin{bmatrix} \frac{4}{3} & -\frac{1}{3} & 0 \\ 0 & 1 & 0 \\ 0 & -\frac{1}{3} & \frac{4}{3} \end{bmatrix}$$

represents a color correction matrix.
In the above Equation 2, $$\begin{bmatrix} 12R + 4G \\ 16G \\ 12B + 4G \end{bmatrix}$$

represents RGB data sensed from the unit pixel group array, and $$\begin{bmatrix} R' \\ G' \\ B \end{bmatrix}$$

represents a corrected RGB data. That is, in order to correct the color value as if each of the red, green, and blue colors is sensed from 16 sub-pixels, the color correction matrix may be set to $$\begin{bmatrix} \frac{4}{3} & -\frac{1}{3} & 0 \\ 0 & 1 & 0 \\ 0 & -\frac{1}{3} & \frac{4}{3} \end{bmatrix}$$

such that the signal-to-noise ratios thereof may be adjusted to be similar to each other.

Referring to FIG. 19, according to some example embodiments, when binning the color values of the sub-pixels of the readout area (for example, the 4 shared readout area) within each sub-pixel group, the color correction matrix may be applied in consideration of the sub-pixel corresponding to the quarter micro lens to calculate the binned color value in each of the sub-pixel groups TGG1, TRG, TBG, and TGG2. For example, in FIG. 19, in the sub-pixel group TGG1, binned color values 3G, 3G, 3G, and 3G may be respectively calculated in the four 4 shared readout areas, that is, four uTGGs. In the sub-pixel group TRG, binned color values 3R, 3R, 3R, and 3R may be respectively calculated in the four 4 shared readout areas, that is, four uTRGs. In the sub-pixel group TBG, binned color values 3B, 3B, 3B, and 3B may be respectively calculated in the four 4 shared readout areas, that is, four uTBGs. In the sub-pixel group TGG2, binned color values 3G, 3G, 3G, and 3G may be respectively calculated in the four 4 shared readout areas, that is, four uTGGs.

Referring to FIG. 20, according to some example embodiments, in each of the sub-pixel groups P_TGG1, P_TRG, P_TBG, and P_TGG2, a binned phase value may be calculated based on sub-pixels corresponding to a quarter micro lens. That is, one quarter micro lens may be included in each of the four 4 shared readout areas (uTGG1, uTRG, uTBG, and uTGG2). Thus, a phase value 1G, 1R, 1B, or 1G may be calculated in each shared readout area.

Hereinafter, an electronic device 2000 according to some example embodiments will be described with reference to FIGS. 21 and 22.

Figure 21:
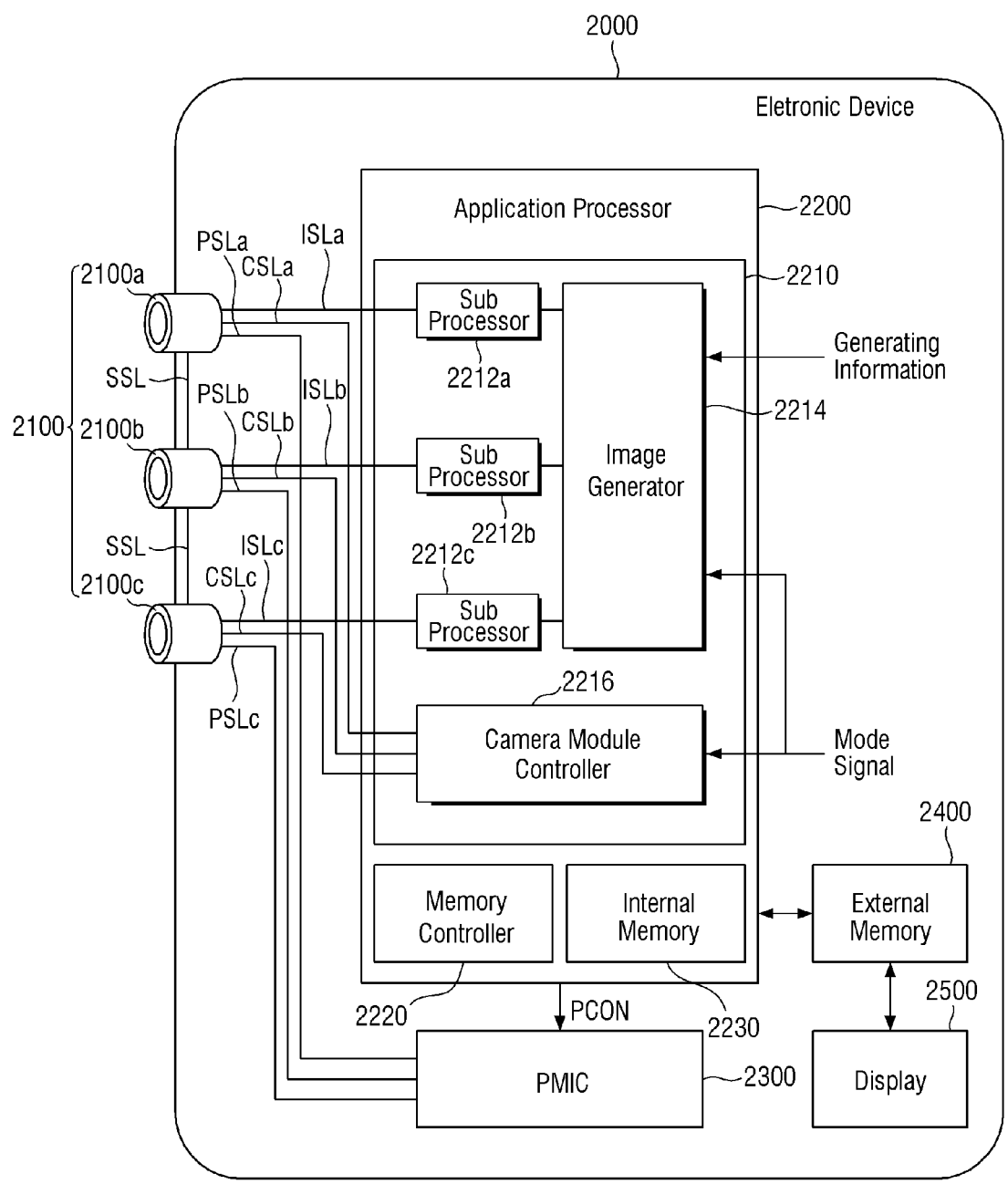
FIG. 21 is a block diagram for illustrating an electronic device including a multi-camera module according to some example embodiments.

FIG. 21 is a block diagram for illustrating an electronic device including a multi-camera module according to some example embodiments. FIG. 22 is a detailed block diagram of the camera module of FIG. 21. For convenience of description, components duplicate with those as described using FIGS. 1 to 20 are briefly described or omitted.

Referring to FIG. 21, the electronic device 2000 may include a camera module group 2100, an application processor 2200, a power management integrated circuit (PMIC) 2300, an external memory 2400 and a display 2500.

The camera module group 2100 may include a plurality of camera modules 2100a, 2100b, and 2100c. Although the drawing shows an example embodiment in which the three camera modules 2100a, 2100b, and 2100c are arranged, example embodiments are not limited thereto. In some example embodiments, the camera module group 2100 may be modified to include only two camera modules. Further, in some example embodiments, the camera module group 2100 may be modified to include n camera modules (n is a natural number of 4 or greater).

In this regard, one of the three camera modules 2100a, 2100b, and 2100c may include the image sensor 100 described using FIGS. 1 to 20. That is, the image sensor 100 of each of the camera modules 2100a, 2100b, and 2100c may include the first pixel array PA1, the second pixel array PA2, the third pixel array PA3, or the fourth pixel array PA4.

Hereinafter, with reference to FIG. 22, a detailed configuration of the camera module 2100b will be described in more detail. However, following descriptions may be equally applied to other camera modules 2100a and 2100c according to an example embodiment.

Figure 22:
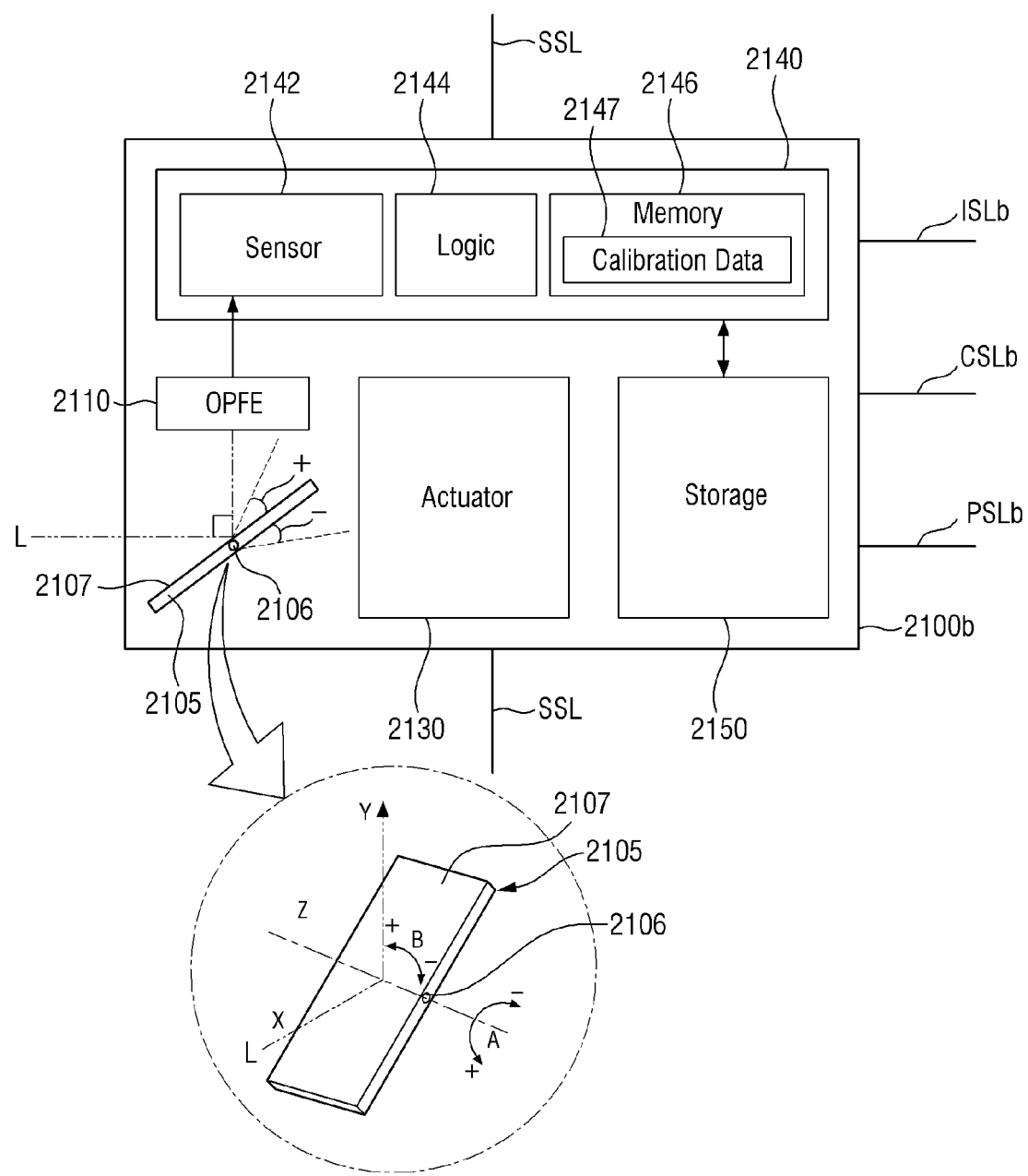
FIG. 22 is a detailed block diagram of a camera module according to some example embodiments.

Referring to FIG. 22, the camera module 2100b may include a prism 2105, an optical path folding element (OPFE) 2110, an actuator 2130, an image sensing device 2140, and storage 2150.

The prism 2105 may include a reflective face 2107 made of a reflective material, and thus may modify a path of light L incident from an outside.

In some example embodiments, the prism 2105 may change the path of the light L such that the light incident thereto in the first direction X is output therefrom in a second direction Y perpendicular to the first direction X. Further, the prism 2105 may rotate the reflective face 2107 of the reflective material in an A direction about a central axis 2106 or may rotate the central axis 2106 in a B direction so that the light incident thereto in the first direction X is output therefrom in the second direction Y perpendicular to the first direction X. The OPFE 2110 may move a third direction Z normal to a plane defined by the first direction X and the second direction Y.

In some example embodiments, as shown, a maximum rotation angle in the A direction of the prism 2105 may be smaller than or equal to 15 degrees in a plus (+) A direction, and may be greater than 15 degrees in a minus (−) A direction. However, example embodiments are not limited thereto.

In some example embodiments, the prism 2105 may move by a range around 20 degrees, or between 10 and 20 degrees, or between 15 and 20 degrees in the plus (+) or minus (−) B direction. The prism 2105 may move by the same angle in the plus (+) and minus (−) B directions. Alternatively, angles by which the prism 2105 may move in the plus (+) and minus (−) B directions, respectively may have a difference of about 1 degree therebetween.

In some example embodiments, the prism 2105 may move the reflective face 2107 made of the light reflective material in the third direction, for example, the Z direction parallel to an extension direction of the inner region axis 2106.

The OPFE 2110 may include a group of m optical lens (m being a natural number). The group of m optical lenses may move in the second direction Y to change an optical zoom ratio of the camera module 2100b. For example, a basic optical zoom ratio of the camera module 2100b may be Z. When the m optical lenses included in the OPFE 2110 move, the optical zoom ratio of the camera module 2100b may be changed to an optical zoom ratio equal to or higher than 3Z or 5Z.

The actuator 2130 may move the OPFE 2110 or the optical lens to a specific position. For example, the actuator 2130 may adjust a position of the optical lens so that the image sensor 2142 is located at a focal length of the optical lens for accurate sensing. For example, the actuator 2130 may adjust the position of the optical lens based on a phase value detected based on a difference between values of sub-pixels which share a micro lens, in order to perform auto focusing.

The image sensing device 2140 may include an image sensor 2142, a control logic 2144 and a memory 2146. The image sensor 2142 may sense an image of a sensing target using the light L provided through the optical lens. In some example embodiments, the image sensor 2142 may include the image sensor 100 as described above.

The control logic 2144 may control all of operations of the camera module 2100b. For example, the control logic 2144 may control an operation of the camera module 2100b based on a control signal provided through a control signal line CSLb.

The memory 2146 may store therein information necessary for the operation of the camera module 2100b, such as calibration data 2147. The calibration data 2147 may include information required when the camera module 2100b generates image data using the light L provided from the outside. The calibration data 2147 may include, for example, information about a degree of rotation, information about a focal length, information about an optical axis, and the like, as described above. When the camera module 2100b is implemented in a multi-state camera form in which the focal length varies based on a position of the optical lens, the calibration data 2147 may include a focal length value based on each position (or each state) of the optical lens, and information related to auto focusing.

The storage 2150 may store therein image data sensed via the image sensor 2142. The storage 2150 may be disposed outside the image sensing device 2140, and may be implemented to be stacked on a sensor chip constituting the image sensing device 2140. In some example embodiments, the storage 2150 may be embodied as an Electrically Erasable Programmable Read-Only Memory (EEPROM). However, example embodiments are not limited thereto.

Referring to FIGS. 21 and 22 together, in some example embodiments, each of the plurality of camera modules 2100a, 2100b, and 2100c may include each actuator 2130. Accordingly, each of the plurality of camera modules 2100a, 2100b, and 2100c may include the same or different calibration data 2147 based on an operation of the actuator 2130 included therein.

In some example embodiments, one camera module (e.g., 2100b) among the plurality of camera modules 2100a, 2100b, and 2100c may be a camera module in a folded lens form including the prism 2105 and the OPFE 2110 as described above, while each of the remaining camera modules (e.g., 2100a and 2100c) may be a vertical-type camera module that does not include the prism 2105 and the OPFE 2110. However, example embodiments are not limited thereto.

In some implementation, one camera module (e.g., 2100c) among the plurality of camera modules 2100a, 2100b, and 2100c, may be a depth camera of a vertical form that extracts depth information, for example, using IR (Infrared Ray). In this case, the application processor 1200 may merge image data provided from the depth camera and image data provided from another camera module (e.g., 2100a or 2100b) to generate a three-dimensional depth image (3D depth image).

In some example embodiments, at least two (e.g., 2100a and 2100b) of the plurality of camera modules 2100a, 2100b, and 2100c may have different FOVs (Field of Views). In this case, for example, at least two of the plurality of camera modules 2100a, 2100b, and 2100c, for example, optical lenses of at least two (e.g., 2100a and 2100b) of the plurality of camera modules 2100a, 2100b, and 2100c may be different from each other. However, example embodiments are not limited thereto.

Further, in some implementation, FOVs of the plurality of camera modules 2100a, 2100b, and 2100c may be different from each other. In this case, the optical lenses respectively included in the plurality of camera modules 2100a, 2100b, and 2100c may also be different from each other. However, example embodiments are not limited thereto.

In some example embodiments, the plurality of camera modules 2100a, 2100b, and 2100c may be physically separated from each other. That is, instead of a scheme in which a sensing area of one image sensor 2142 is divided into a plurality of sub-areas which correspond to the plurality of camera modules 2100a, 2100b, and 2100c, a scheme in which an individual image sensor 2142 may be disposed in each of the plurality of camera modules 2100a, 2100b, and 2100c may be employed.

Referring back to FIG. 21, the application processor 2200 may include an image processing device 2210, a memory controller 2220, and an internal memory 2230. The application processor 2200 may be implemented to be separated from the plurality of camera modules 2100a, 2100b, and 2100c. For example, the application processor 2200 and the plurality of camera modules 2100a, 2100b, and 2100c may be implemented as separate semiconductor chips separated from each other.

The image processing device 2210 may include a plurality of sub-image processors 2212a, 2212b, and 2212c, an image generator 2214 and a camera module controller 2216.

The number of the sub-image processors 2212a, 2212b, and 2212c may correspond to the number of camera modules 2100a, 2100b, and 2100c.

Image data generated from each of the camera modules 2100a, 2100b, and 2100c may be provided to each of the sub-image processors 2212a, 2212b, and 2212c via each of image signal lines ISLa, ISLb, and ISLc separated from each other. For example, the image data generated from the camera module 2100a may be transmitted to the sub-image processor 2212a via the image signal line ISLa. The image data generated from the camera module 2100b may be transmitted to the sub-image processor 2212b via the image signal line ISLb. The image data generated from the camera module 2100c may be transmitted to the sub-image processor 2212c via the image signal line ISLc. The image data transmission may be performed, for example, using a camera serial interface (CSI) based on a Mobile Industry Processor Interface (MIPI). However, example embodiments are not limited thereto.

In one example, in some implementation, one sub-image processor may correspond to a plurality of camera modules. For example, the sub-image processor 2212a and the sub-image processor 2212c may not be implemented separately from each other as shown, but may be integrated into one sub-image processor. The image data provided from the camera module 2100a and the camera module 2100c may be selected via a selection element, for example, a multiplexer, and may then be provided to the integrated sub-image processor.

The image data provided to each of the sub-image processors 2212a, 2212b, and 2212c may be provided to the image generator 2214. The image generator 2214 may generate an output image using the image data provided from each of the sub-image processors 2212a, 2212b, and 2212c and based on image generation information or a mode signal.

Specifically, the image generator 2214 may merge at least a portion of the image data generated from the camera modules 2100a, 2100b, and 2100c having different FOVs, and based on the image generation information or the mode signal, and thus may generate the output image as the merging result. Further, the image generator 2214 may select one of the image data generated from the camera modules 2100a, 2100b, and 2100c having different FOVs, and based on the image generation information or the mode signal and thus may generate the output image as the selected data.

In some example embodiments, the image generation information may include a zoom signal or a zoom factor. Further, in some example embodiments, the mode signal may be, for example, a signal based on a mode selected by a user.

When the image generation information is the zoom signal or the zoom factor, and the camera modules 2100a, 2100b, and 2100c have different FOVs, the image generator 2214 may perform different operations based on the zoom signal. For example, when the zoom signal is a first signal, the image generator may merge the image data output from the camera module 2100a and the image data output from the camera module 2100c with each other, and generate the output image using the merged image data, and the image data output from the camera module 2100b not used in the merging operation. When the zoom signal is a second signal different from the first signal, the image generator 2214 may not perform such an image data merging operation, but may select one of the image data output from the camera modules 2100a, 2100b, and 2100c and may generate the selected data as the output image. However, example embodiments are not limited thereto. A scheme for processing the image data may be modified as needed.

In some example embodiments, the image generator 2214 may receive a plurality of image data having different exposure times from at least one of the plurality of sub-image processors 2212a, 2212b, and 2212c, and may perform high dynamic range (HDR) processing on the received plurality of image data, thereby generating merged image data having an increased dynamic range.

The camera module controller 2216 may provide a control signal to each of the camera modules 2100a, 2100b, and 2100c. The control signal generated from the camera module controller 2216 may be provided to a corresponding one of the camera modules 2100a, 2100b, and 2100c via a corresponding one of the control signal lines CSLa, CSLb, and CSLc separated from each other.

One of the plurality of camera modules 2100a, 2100b, and 2100c may be designated as a master camera (e.g., 2100b) based on the image generation information indicated by the zoom signal or the mode signal, while each of the remaining camera modules (e.g., 2100a and 2100c) may be designated as a slave camera. This designation information may be indicated by the control signal and may be provided to a corresponding one of the camera modules 2100a, 2100b, and 2100c via a corresponding one of the control signal lines CSLa, CSLb, and CSLc separated from each other.

The camera module acting as the master or slave camera may vary based on the zoom factor or an operation mode signal. For example, when the FOV of the camera module 2100a is larger than that of the camera module 2100c, and the zoom factor indicates a low zoom ratio, the camera module 2100c may act as a master camera, while the camera module 2100a may act as a slave camera. Conversely, when the zoom factor indicates a high zoom ratio, the camera module 2100a may act as a master camera, while the camera module 2100c may act as a slave camera.

In some example embodiments, the control signal from the camera module controller 2216 provided to each of the camera modules 2100a, 2100b, and 2100c may include a sync enable signal. For example, when the camera module 2100b is the master camera, and each of the camera modules 2100a and 2100c is the slave camera, the camera module controller 2216 may transmit the sync enable signal to the camera module 2100b. Upon receiving such a sync enable signal, the camera module 2100b may generate a sync signal based on the provided sync enable signal, and may provide the generated sync signal to the camera modules 2100a and 2100c via a sync signal line SSL. The camera module 2100b and the camera modules 2100a and 2100c may transmit the image data to the application processor 2200 while the camera module 2100b and the camera modules 2100a and 2100c are synchronized with each other using the sync signal.

In some example embodiments, the control signal from the camera module controller 2216 provided to each of the plurality of camera modules 2100a, 2100b, and 2100c may indicate mode information according to the mode signal. Based on this mode information, the plurality of camera modules 2100a, 2100b, and 2100c may operate in a first operation mode or a second operation mode in relation to a sensing speed.

In a first operation mode, the plurality of camera modules 2100a, 2100b, and 2100c may generate an image signal at a first speed (for example, may generate an image signal at a first frame rate), may encode the image signal at a second speed higher than the first speed (for example, encode the image signal at a second frame rate higher than the first frame rate) and may transmit the encoded image signal to the application processor 2200. The second speed may be lower than or equal to 30 times of the first speed.

The application processor 2200 may store the received image signal, that is, the encoded image signal, in the memory 2230 provided therein, or storage 2400 external to the application processor 2200, and then, read and decode the encoded image signal from the memory 2230 or the storage 2400, and then, display image data generated based on the decoded image signal. For example, a corresponding auxiliary processor among the plurality of auxiliary processors 2212a, 2212b, and 2212c of the image processing device 2210 may perform the decoding, and may perform the image processing on the decoded image signal. For example, image data generated based on the decoded image signal may be displayed on the display 2500.

In a second operation mode, the plurality of camera modules 2100a, 2100b, and 2100c may generate an image signal at a third speed lower than the first speed (for example, generate an image signal at a third frame rate lower than the first frame rate), and then transmit the image signal to the application processor 2200. The image signal provided to the application processor 2200 may be an unencoded signal. The application processor 2200 may perform image processing on the received image signal or may store the image signal in the memory 2230 or the storage 2400.

The PMIC 2300 may supply power, for example, a power supply voltage to each of the plurality of camera modules 2100a, 2100b, and 2100c. For example, the PMIC 2300 may supply first power to the camera module 2100a through a first power signal line PSLa, supply second power to the camera module 2100b through a second power signal line PSLb, and supply third power to the camera module 2100c through a third power signal line PSLc, under control of the application processor 2200.

The PMIC 2300 may generate power corresponding to each of the plurality of camera modules 2100a, 2100b, and 2100c and adjust a power level, in response to a power control signal PCON from the application processor 2200. The power control signal PCON may include an operation mode-based power adjustment signal for the plurality of camera modules 2100a, 2100b, and 2100c. For example, the operation mode may include a low power mode. The power control signal PCON may indicate information about a camera module operating in the low power mode and information about a set power level. Levels of powers respectively provided to the plurality of camera modules 2100a, 2100b, and 2100c may be the same as or different from each other. Further, the level of the power may vary dynamically.

While aspects of example embodiments have been particularly shown and described, it will be understood that various changes in form and details may be made therein without departing from the spirit and scope of the following claims.

What is claimed is:

1. An image sensor comprising:
    a pixel array comprising a plurality of pixel groups, wherein the plurality of pixel groups are arranged in a Bayer pattern, wherein each of the plurality of pixel groups, comprises sixteen sub-pixels arranged that are arranged in a 4×4 array and correspond to a common color, and wherein the 4×4 array of each of the plurality of pixel groups comprises a plurality of readout areas that are activated alternately with each other;
    a row driver connected to a row of the pixel array; and
    a readout circuit configured to sample a pixel signal from the pixel array, to compare the sampled pixel signal with a ramp signal, and to generate a digital image signal based on a comparison of the pixel signal and the ramp signal,
    wherein in each of the plurality of readout areas in each of the plurality of pixel groups, micro lenses are arranged asymmetrically with each other.
2. The image sensor of claim 1, wherein the plurality of pixel groups comprises a first green pixel group comprising sixteen first green sub-pixels arranged in a 4×4 array, a red pixel group comprising sixteen red sub-pixels arranged in a 4×4 array, a blue pixel group comprising sixteen first blue sub-pixels arranged in a 4×4 array, and a second green pixel group comprising sixteen second green sub-pixels arranged in a 4×4 array, and
    wherein the image sensor further comprises a color filter array corresponding to each of the plurality of pixel groups.
3. The image sensor of claim 1, wherein a first pixel group among the plurality of pixel groups comprises:
    single micro lenses arranged in each of a first row and a fourth row of the 4×4 array, wherein each single micro lens corresponds to an individual sub-pixel; and
    a shared micro lens arranged in each of a second row and a third row of the 4×4 array, wherein the shared micro lens is shared by sub-pixels.
4. The image sensor of claim 1, wherein a first pixel group among the plurality of pixel groups comprises:
    single micro lenses arranged in each of a first column and a fourth column of the 4×4 array; and
    one shared micro lens shared by four sub-pixels in a second row and a third row in a second column and a third column of the 4×4 array.
5. The image sensor of claim 4, wherein the one shared micro lens has a full circular shape.
6. The image sensor of claim 1, wherein a first pixel group among the plurality of pixel groups comprises:
    four quarter micro lenses disposed on sub-pixels disposed at each of four corners of the 4×4 array; and
    single micro lenses disposed on each remaining sub-pixels except for the sub-pixels disposed at the four corners of the 4×4 array.
7. The image sensor of claim 6, wherein the sub-pixels disposed at each of the four corners of the 4×4 array is a green sub-pixel, and
    wherein the remaining sub-pixels except for the sub-pixels disposed at the four corners of the 4×4 array are red sub-pixels, blue sub-pixels or green sub-pixels.
8. The image sensor of claim 1, wherein an arrangement of micro lenses across readout areas adjacent to each other among the plurality of readout areas in a pixel group among the plurality of pixel groups has a line-symmetrical arrangement.
9. An image sensor comprising:
    a pixel array comprising a plurality of pixel groups arranged in a Bayer pattern, wherein a pixel group of the plurality of pixel groups, comprises sixteen sub-pixels arranged in a 4×4 array, wherein the 4×4 array comprises a plurality of readout areas, and wherein the plurality of readout areas are activated alternately with each other;
    single micro lenses arranged in each of a first column and a fourth column of the 4×4 array;
    a first shared micro lens arranged in a second row on each of a second column and a third column of the 4×4 array;
    a second shared micro lens arranged in a third row on each of the second column and the third column of the 4×4 array;
    a row driver connected to a row of the pixel array; and
    a readout circuit configured to sample a pixel signal from the pixel array, to compare the sampled pixel signal with a ramp signal, and to generate a digital image signal based on a comparison of the pixel signal and the ramp signal, wherein in each of the plurality of readout areas in the pixel group, micro lenses are arranged asymmetrically with each other.

10. The image sensor of claim 9, wherein the first shared micro lens and the second shared micro lens each have an elliptical shape.

11. An image sensor comprising:
a pixel array comprising a plurality of pixel groups, wherein the plurality of pixel groups are arranged in a Bayer pattern, and wherein each of the plurality of pixel groups arranged in the Bayer pattern comprises sixteen sub-pixels that are arranged in a 4×4 array and correspond to a common color;
a row driver connected to a row of the pixel array; and
a readout circuit configured to sample a pixel signal from the pixel array, to compare the sampled pixel signal with a ramp signal, and to generate a digital image signal based on a comparison of the pixel signal and the ramp signal,
wherein an outer area of a pixel group among the plurality of pixel groups surrounds an inner area of the pixel group,
wherein at least one shared micro lens is disposed in the inner area,
wherein a single micro lens is disposed on each of sub-pixel in the outer area,
wherein the pixel group comprises a plurality of readout areas,
wherein the readout circuit is configured to read out pixel values of sub-pixels in at least two readout areas and to detect a phase value based on the pixel values, and
wherein micro lenses are asymmetrically arranged in each of the at least two readout areas.

12. The image sensor of claim 11, wherein the inner area comprises four sub-pixels.

13. The image sensor of claim 11, wherein a first shared micro lens is disposed on two sub-pixels of a first row of the inner area, and
wherein a second shared micro lens is disposed on two sub-pixels of a second row of the inner area.

14. The image sensor of claim 13, wherein each of the first shared micro lens and the second shared micro lens has an elliptical shape.

15. The image sensor of claim 11, wherein the at least one shared micro lens is disposed on all sub-pixels disposed in the inner area.

16. The image sensor of claim 15, wherein the at least one shared micro lens has a full circular shape.

* * * * *